(12) United States Patent
Sirichai

(10) Patent No.: US 10,601,965 B2
(45) Date of Patent: Mar. 24, 2020

(54) CRADLE ASSEMBLY AND FORMATION FOR A MOBILE COMMUNICATIONS DEVICE

(71) Applicant: World Richman Manufacturing Corporation, Elgin, IL (US)

(72) Inventor: Saharut Sirichai, Bangkok (TH)

(73) Assignee: World Richman Manufacturing Corporation, Elgin, IL (US)

( * ) Notice: Subject to any disclaimer, the term of this patent is extended or adjusted under 35 U.S.C. 154(b) by 0 days.

(21) Appl. No.: 16/429,865

(22) Filed: Jun. 3, 2019

(65) Prior Publication Data

US 2019/0373088 A1    Dec. 5, 2019

Related U.S. Application Data

(60) Provisional application No. 62/679,858, filed on Jun. 3, 2018.

(51) Int. Cl.

| H04M 1/00 | (2006.01) |
|---|---|
| H04M 1/02 | (2006.01) |
| A45C 11/00 | (2006.01) |
| H04M 1/04 | (2006.01) |
| H04M 1/725 | (2006.01) |

(52) U.S. Cl.
CPC ......... *H04M 1/0202* (2013.01); *A45C 11/00* (2013.01); *H04M 1/04* (2013.01); *A45C 2011/002* (2013.01); *H04M 1/72519* (2013.01); *H04M 1/72522* (2013.01)

(58) Field of Classification Search
CPC ......... H04M 1/0202; H04M 1/72519; H04M 1/72522; H04M 1/04; A45C 11/00; A45C 2011/002

USPC ................. 455/575.1, 556.2, 575.8
See application file for complete search history.

(56) References Cited

U.S. PATENT DOCUMENTS

| 9,247,786 B2* | 2/2016 | Fennell | A44B 18/0061 |
|---|---|---|---|
| 2006/0217163 A1* | 9/2006 | Ohmori | G06F 1/1632 455/575.1 |
| 2008/0141921 A1* | 6/2008 | Hinderks | B63B 1/28 114/274 |

(Continued)

*Primary Examiner* — Danh C Le
(74) *Attorney, Agent, or Firm* — Christopher J. Scott

(57) ABSTRACT

A cradle formation receives and cradles a mobile communications device, and includes a device-receiving mouth, a device edge-opposing periphery portion, a device back-opposing portion, and fastener-letting apertures. The device back-opposing portion is characterized by an accessory-receiving depression and depression-flanking portions. The accessory-receiving depression extends in a depression plane, and the depression-flanking portions extend in a flanking plane parallel to the depression plane. The fastener-letting apertures are positioned at lateral sides of the accessory-receiving depression. The cradle formation is usable in combination with select accessory or fastener assemblies attachable to the cradle formation via the fastener-letting apertures. A banded accessory assembly, for example, may include a band portion having a band width and a band thickness. The band portion is receivable in the accessory-receiving depression via the fastener-letting apertures such that the band width extends intermediate the opposed depression-flanking portions and the band thickness extends intermediate the depression and flanking planes.

19 Claims, 43 Drawing Sheets

(56) References Cited

U.S. PATENT DOCUMENTS

| | | | |
|---|---|---|---|
| 2009/0032665 A1* | 2/2009 | Smith, Jr. | B60R 11/0252 |
| | | | 248/343 |
| 2013/0076157 A1* | 3/2013 | Stein | A61F 2/442 |
| | | | 307/116 |
| 2014/0183314 A1* | 7/2014 | Mulhern | F16M 13/022 |
| | | | 248/288.11 |
| 2015/0194648 A1* | 7/2015 | Fathollahi | H01M 2/1061 |
| | | | 429/98 |
| 2016/0211875 A1* | 7/2016 | Smith | H04B 1/385 |
| 2016/0316872 A1* | 11/2016 | Huang | H04M 1/185 |
| 2016/0366997 A1* | 12/2016 | Sirichai | A45C 11/00 |
| 2017/0141088 A1* | 5/2017 | Zhai | H01L 23/3128 |

* cited by examiner

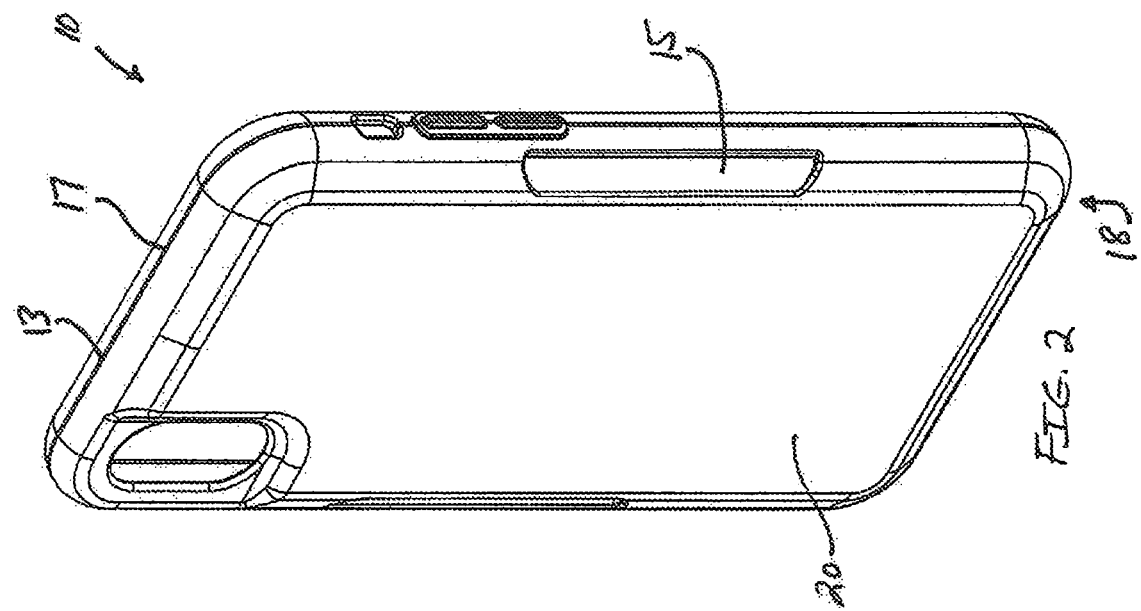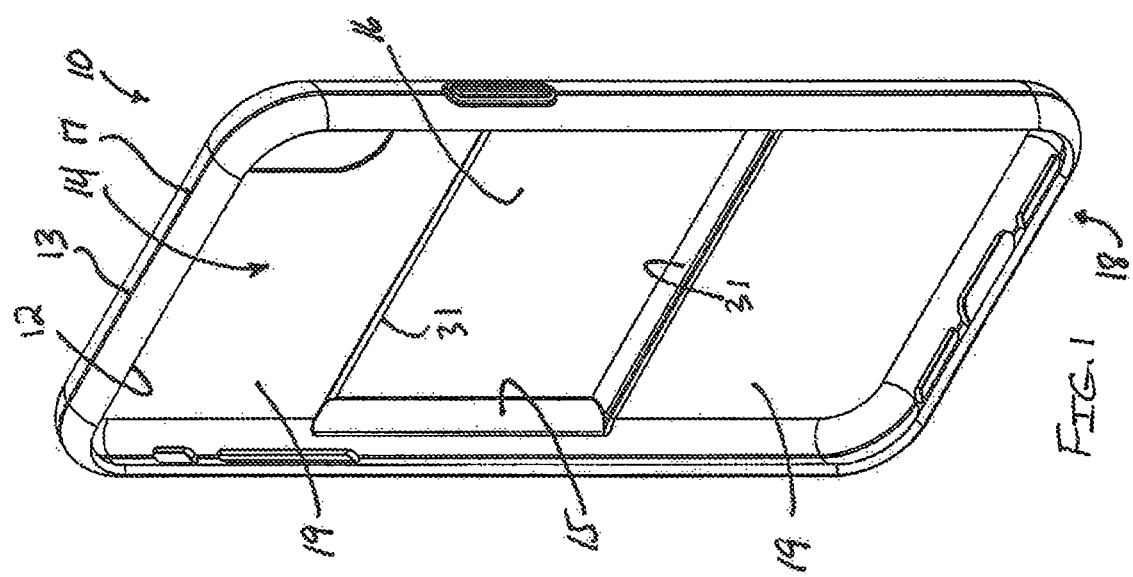

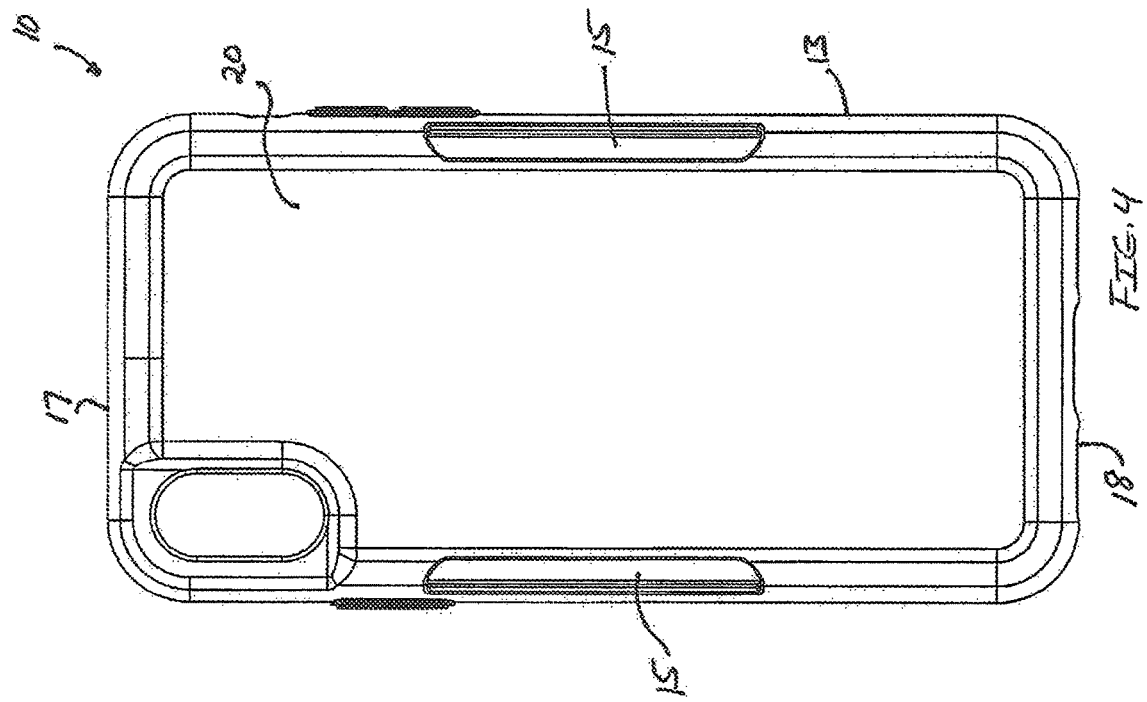
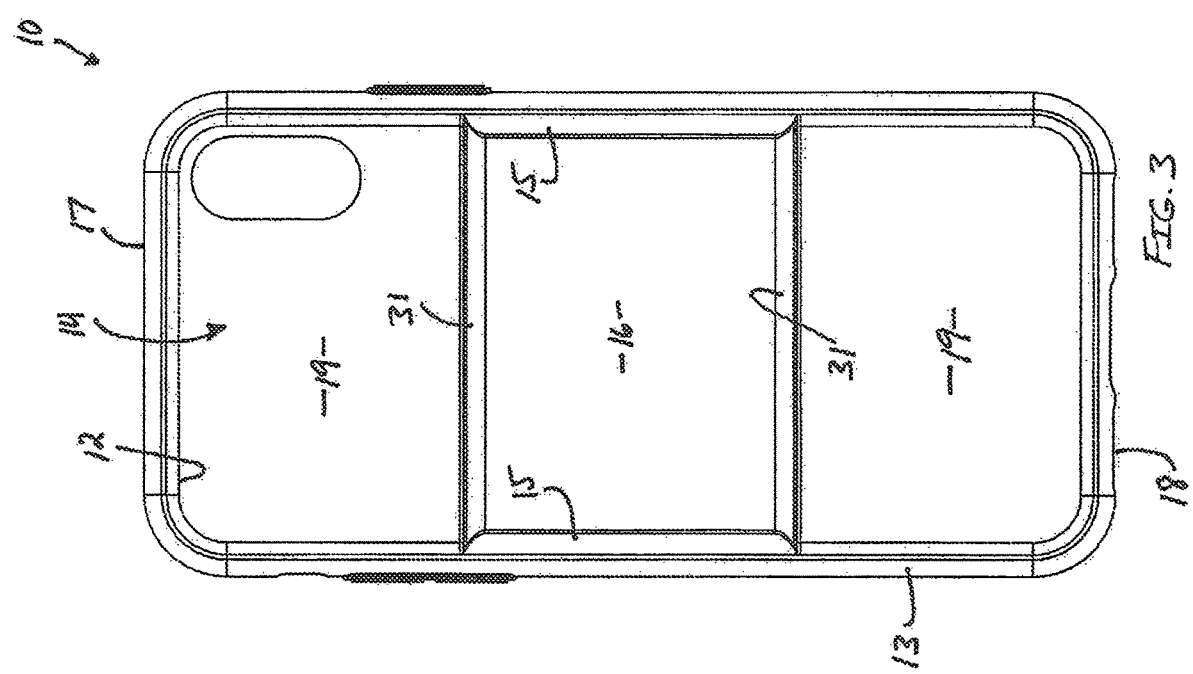

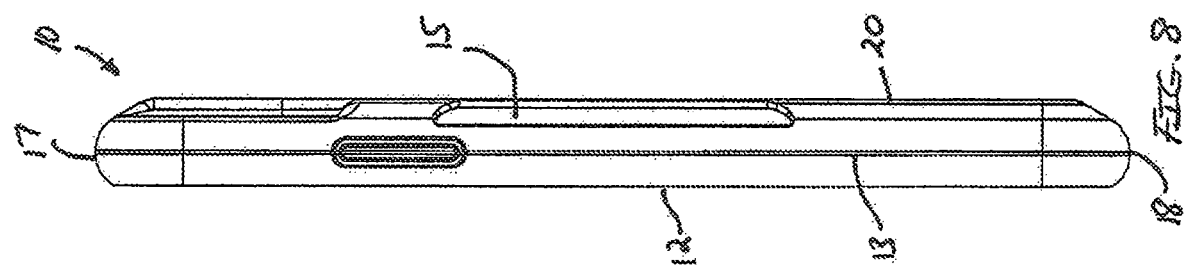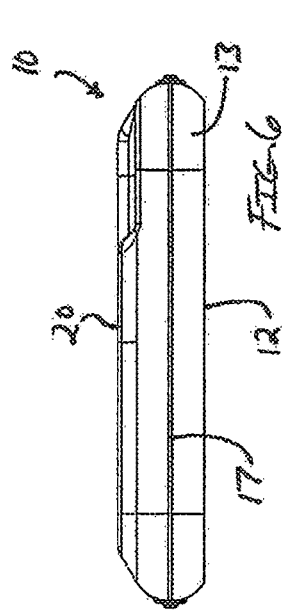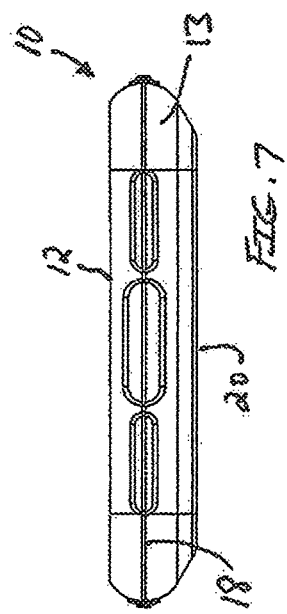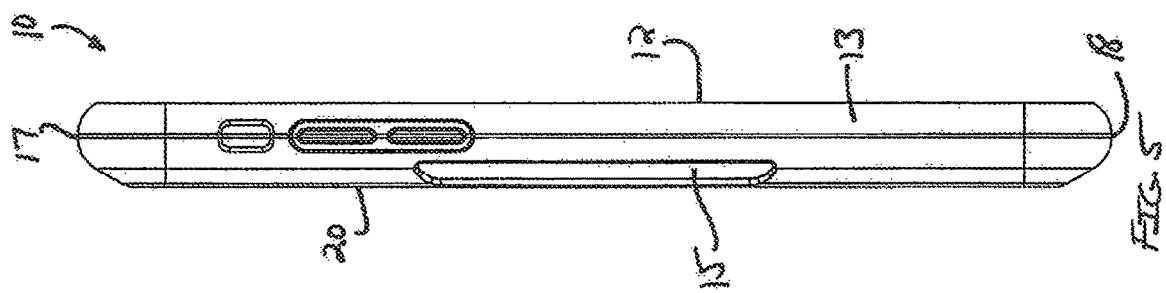

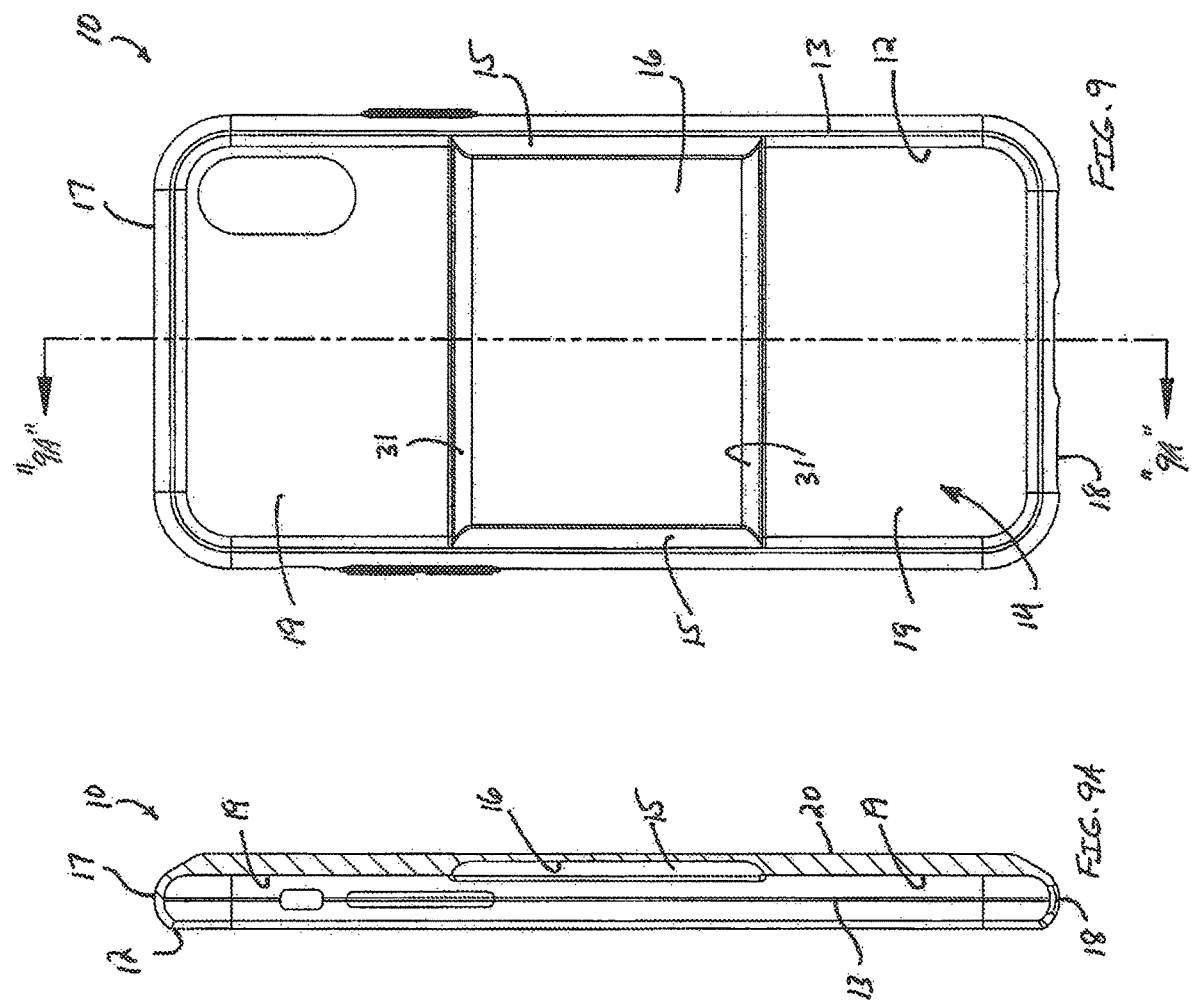

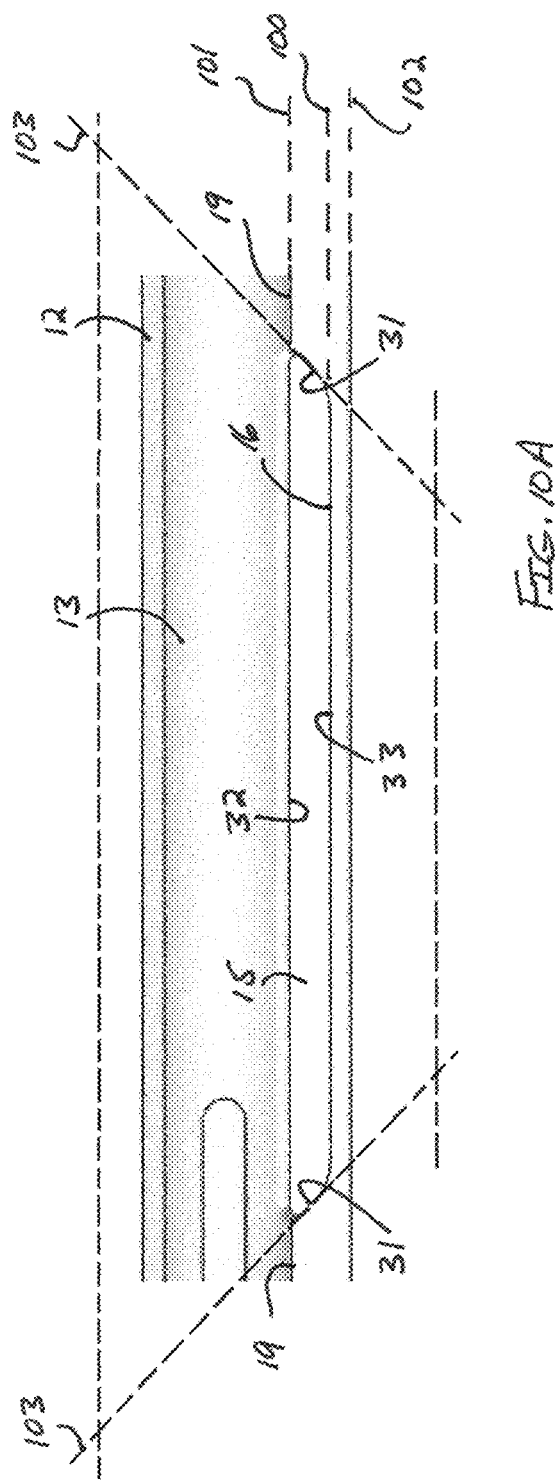

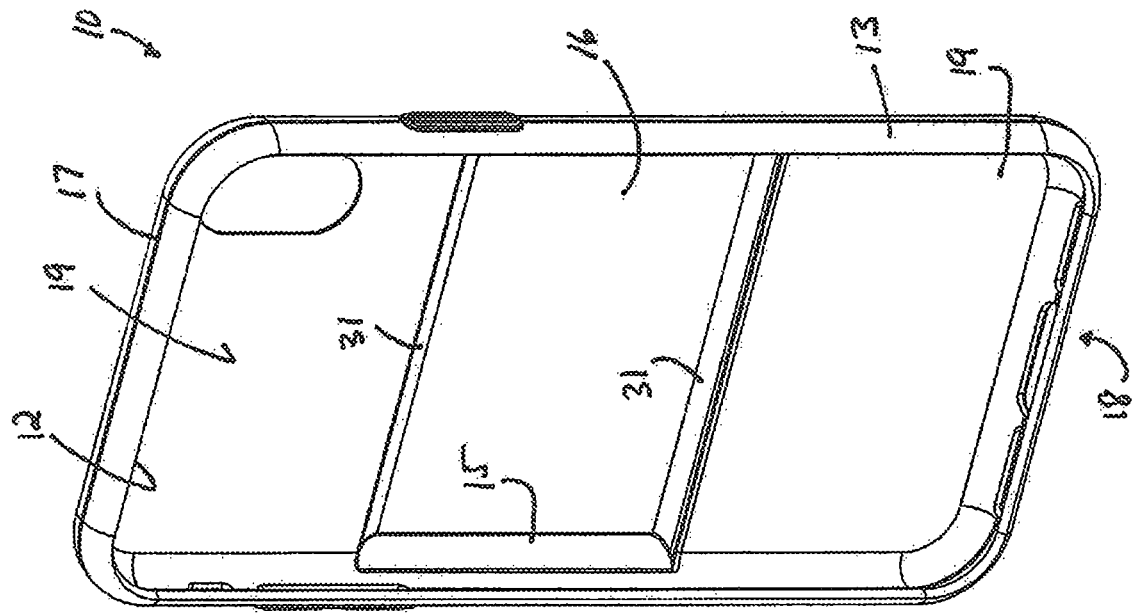
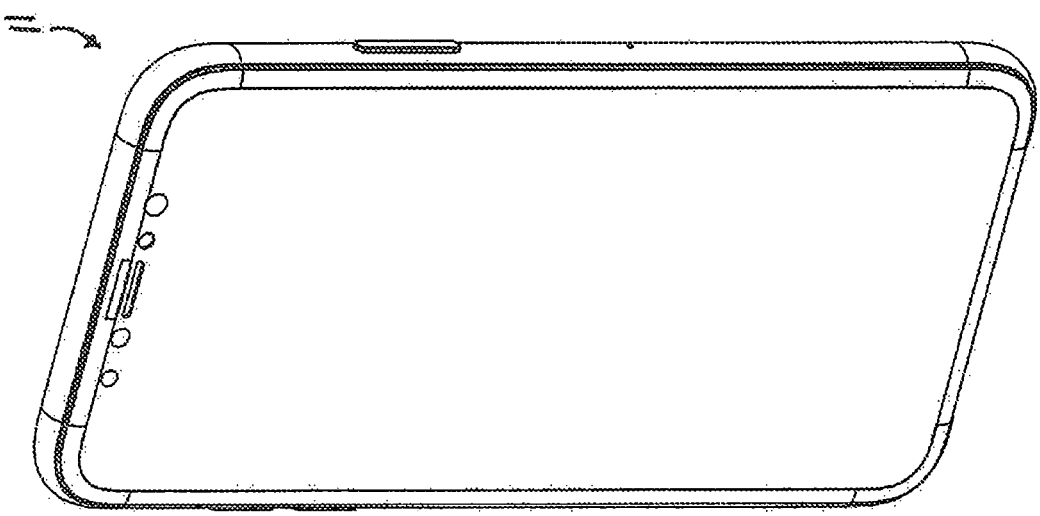
FIG. 11
PRIOR ART

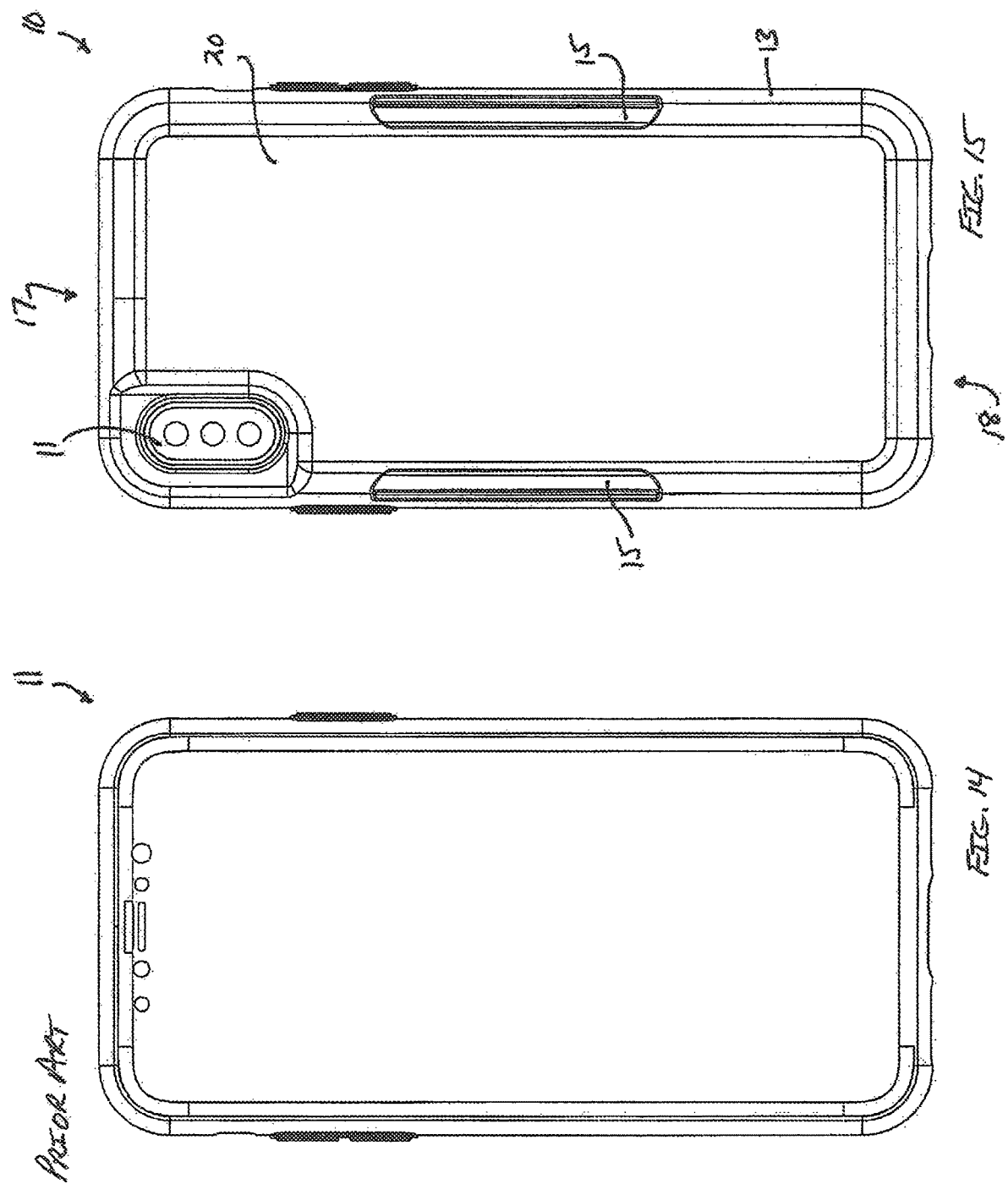

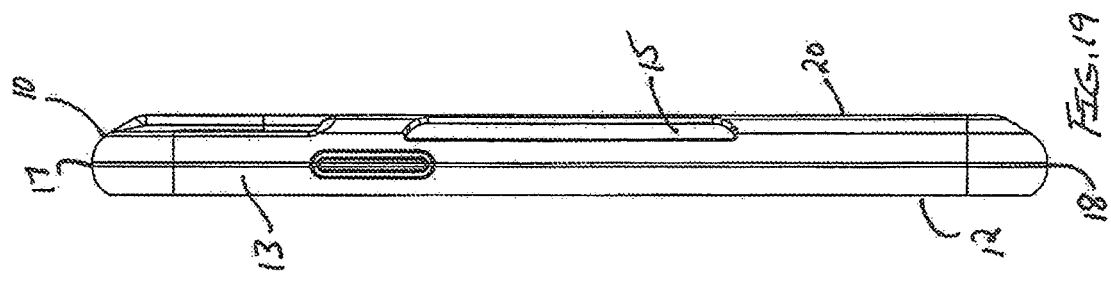
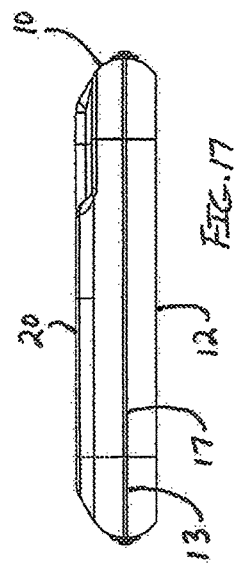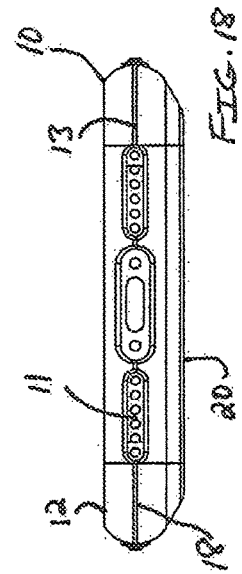
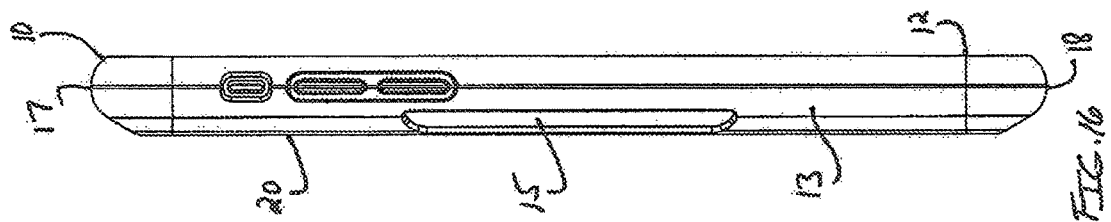

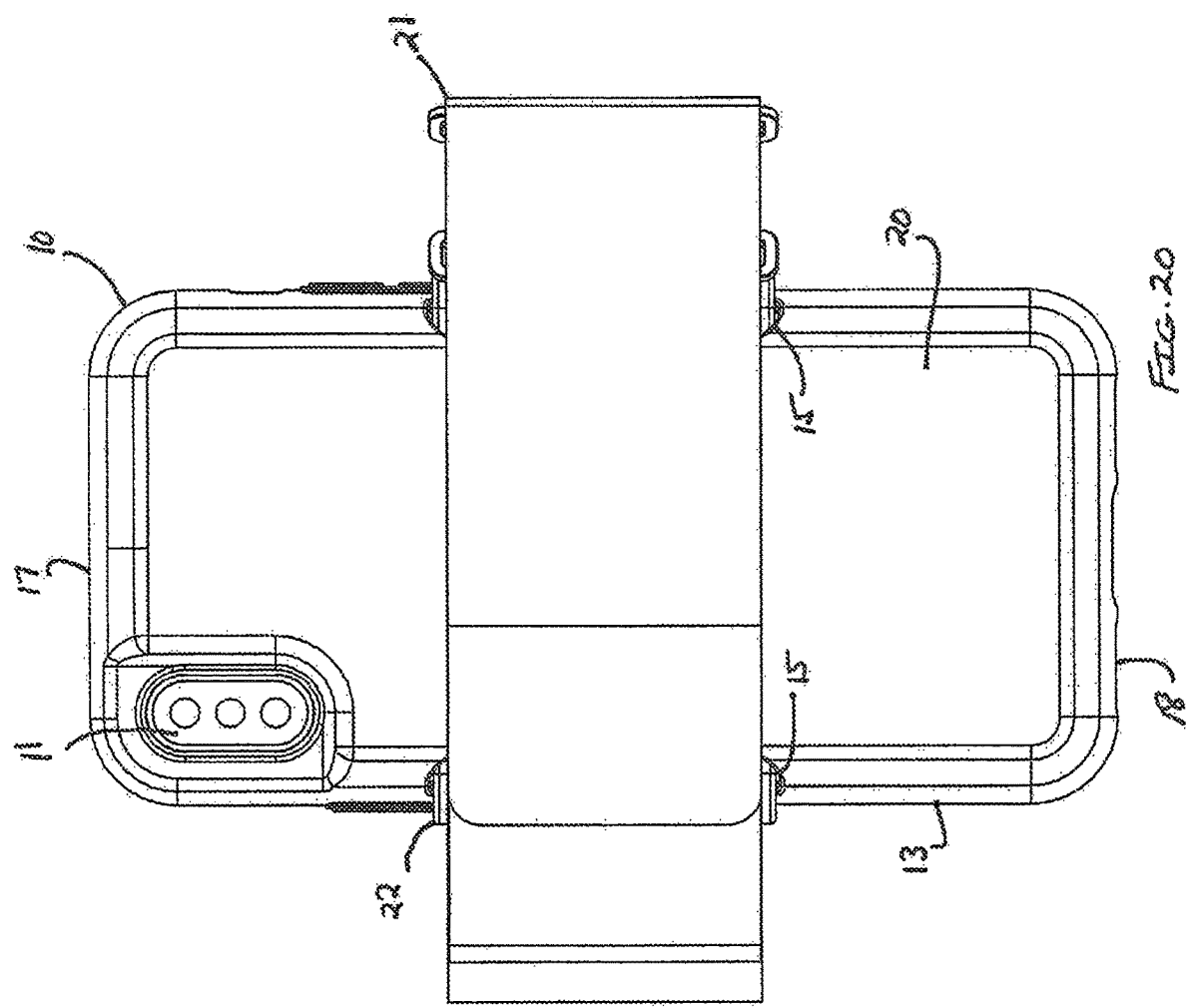

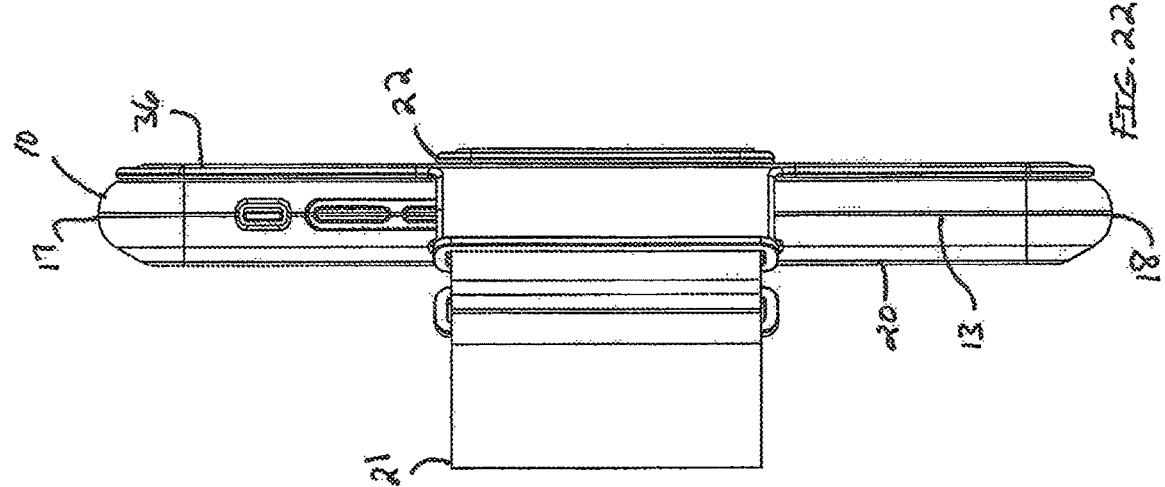
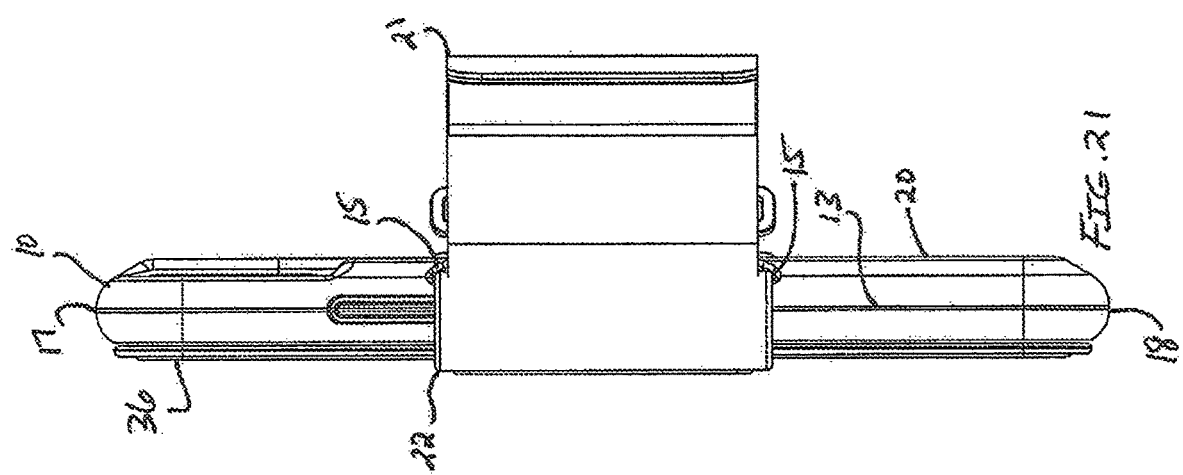

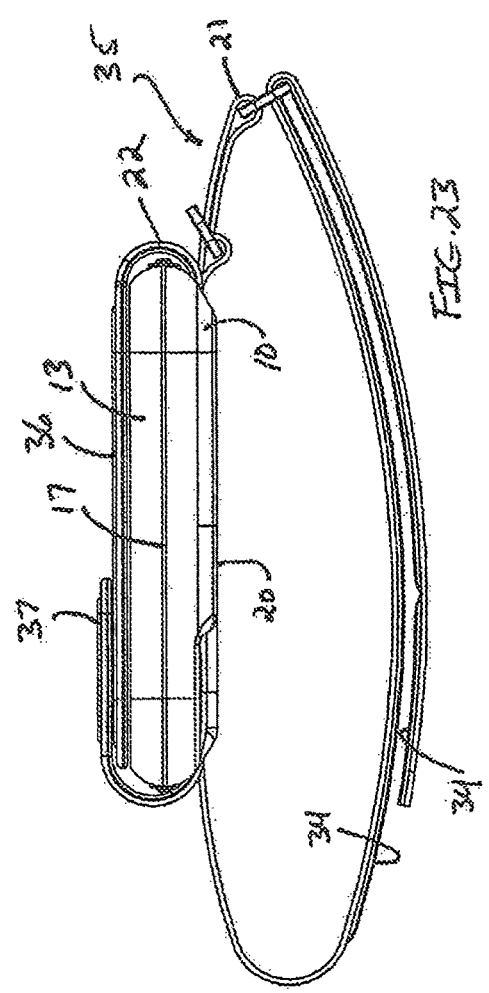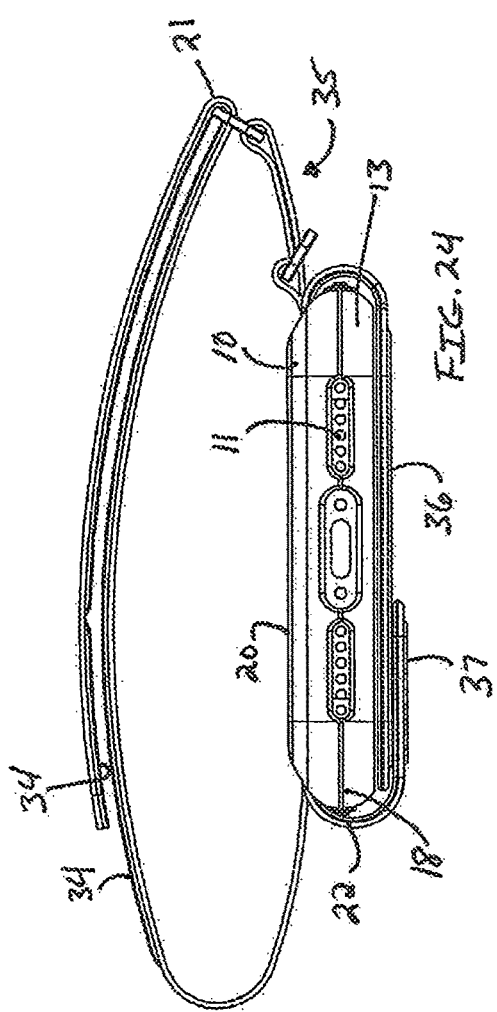

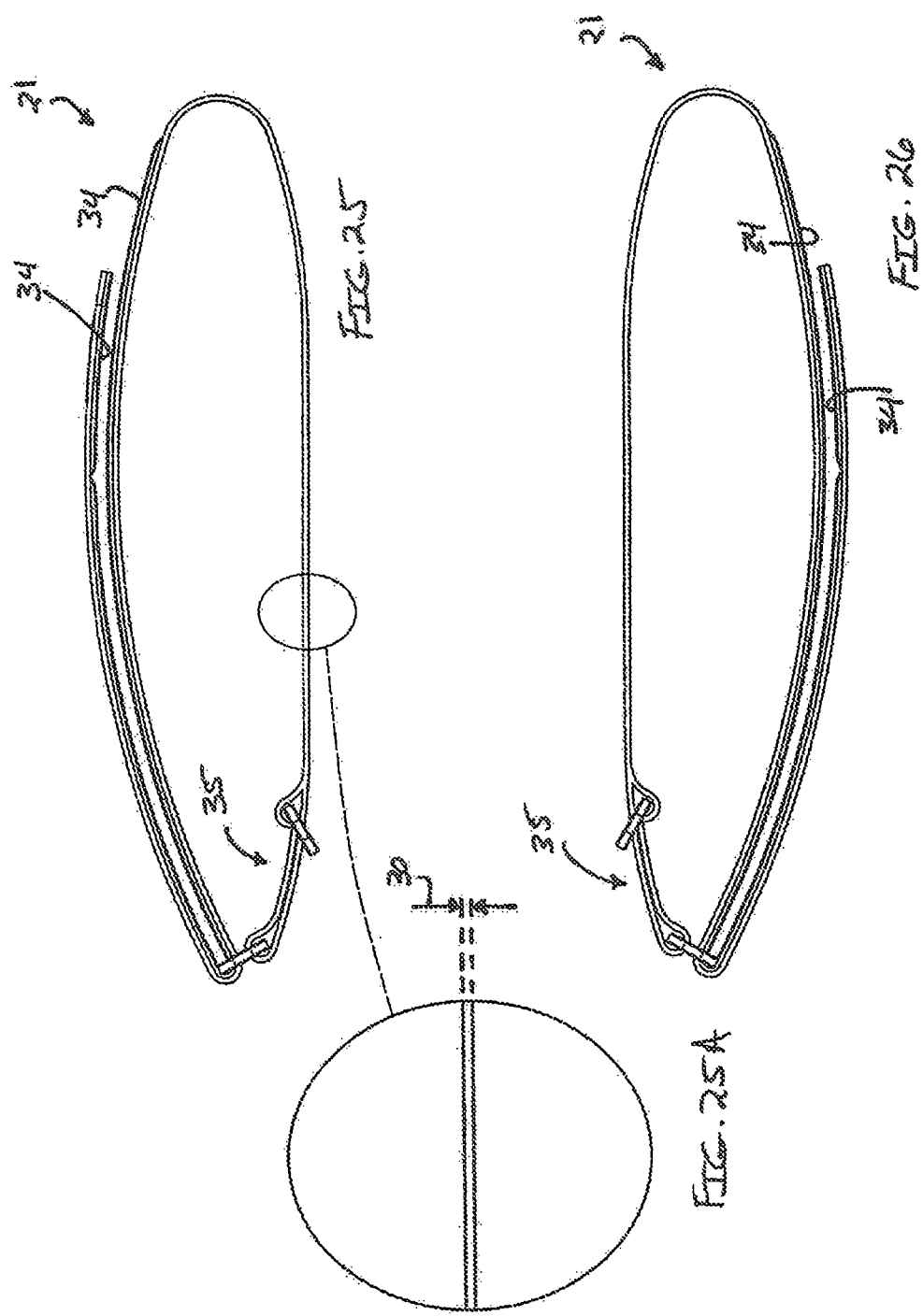

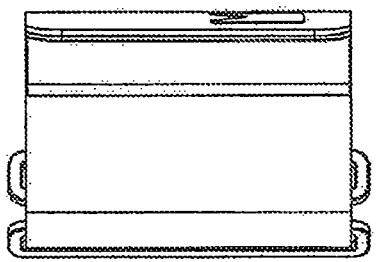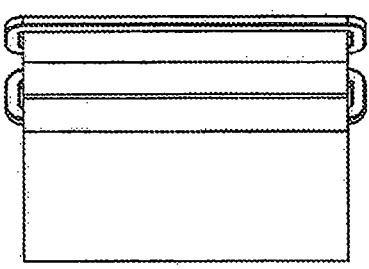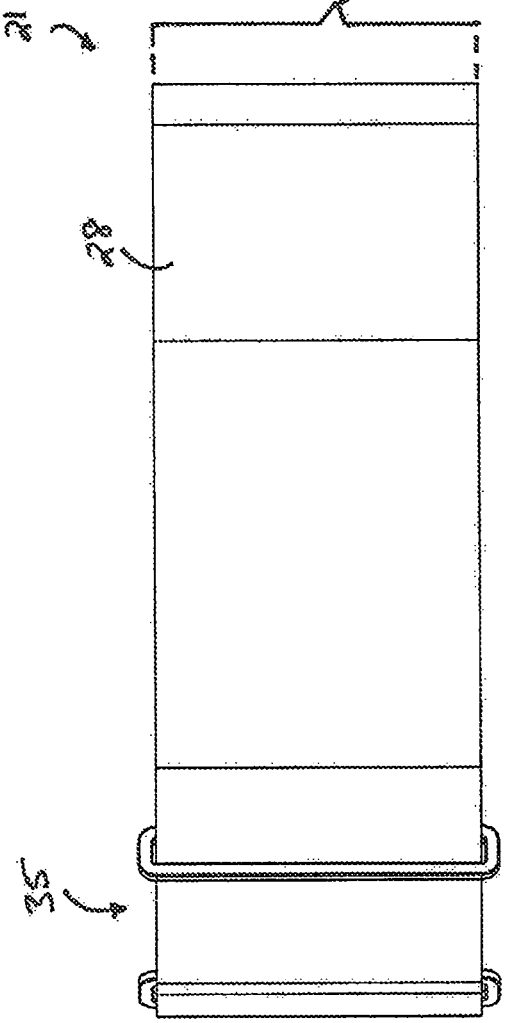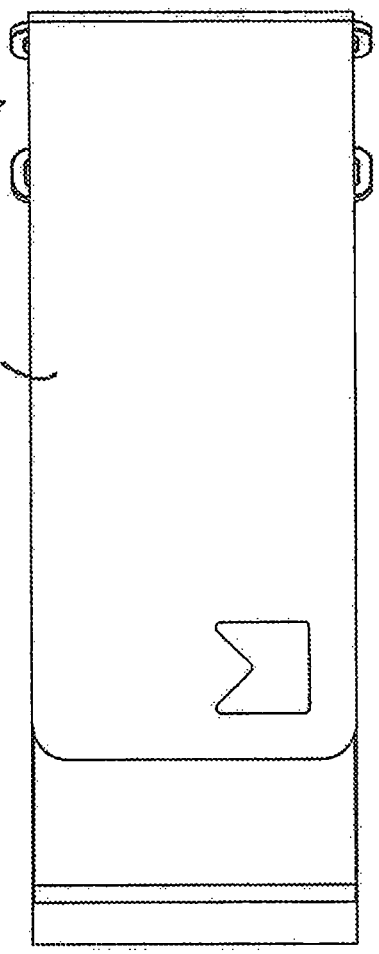

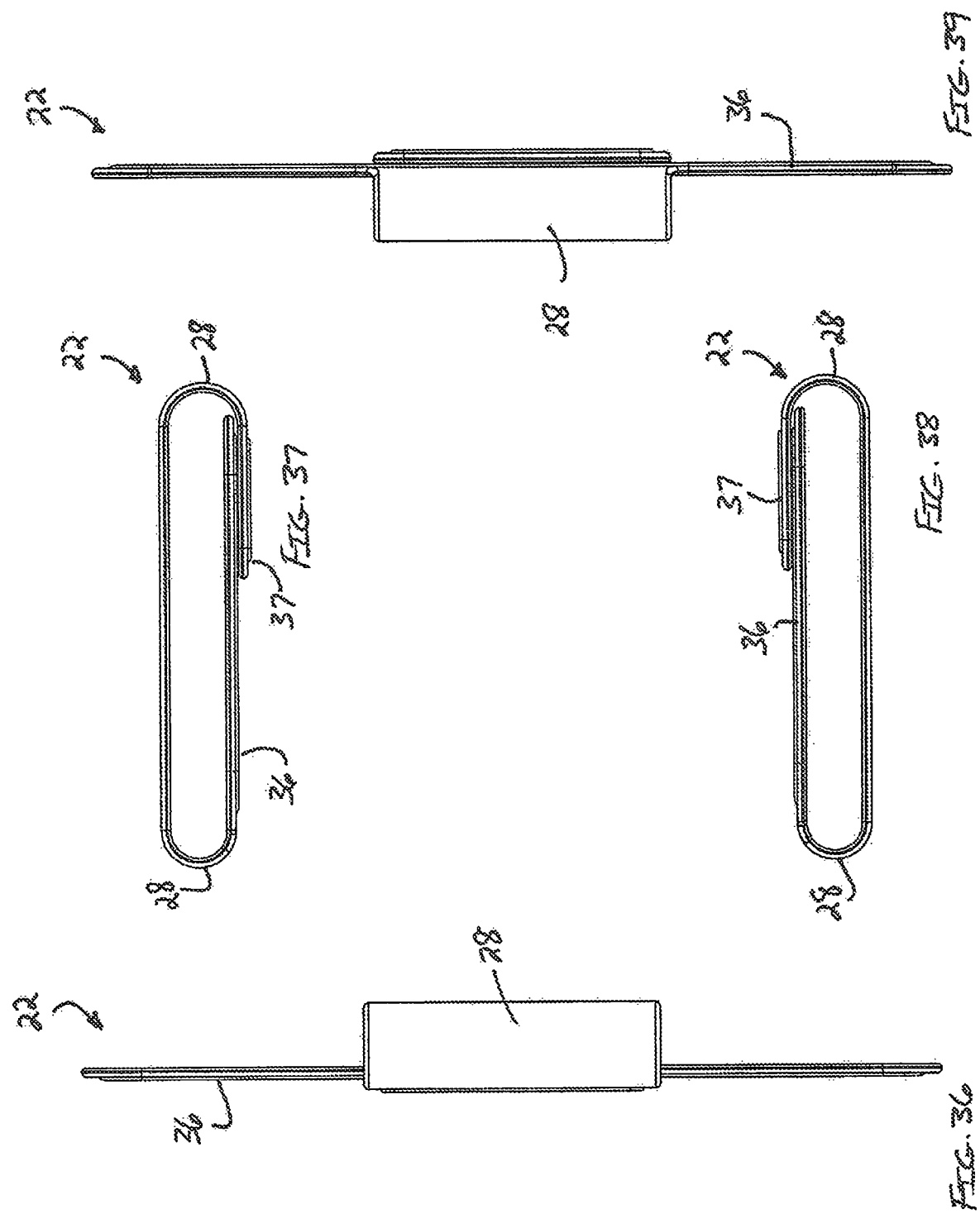

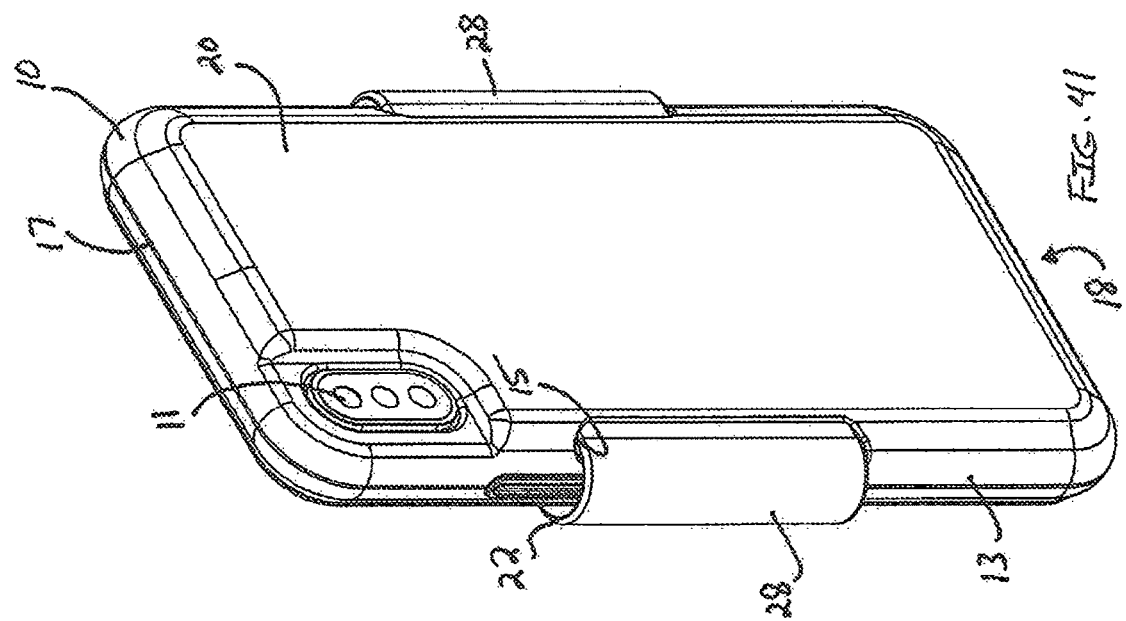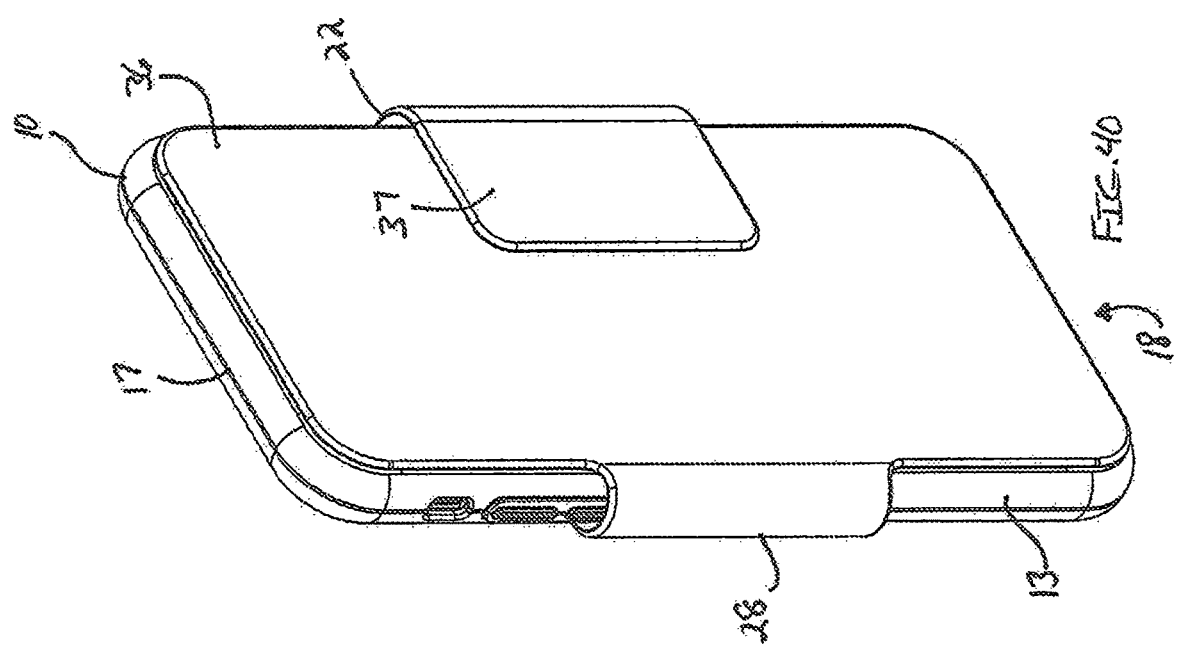

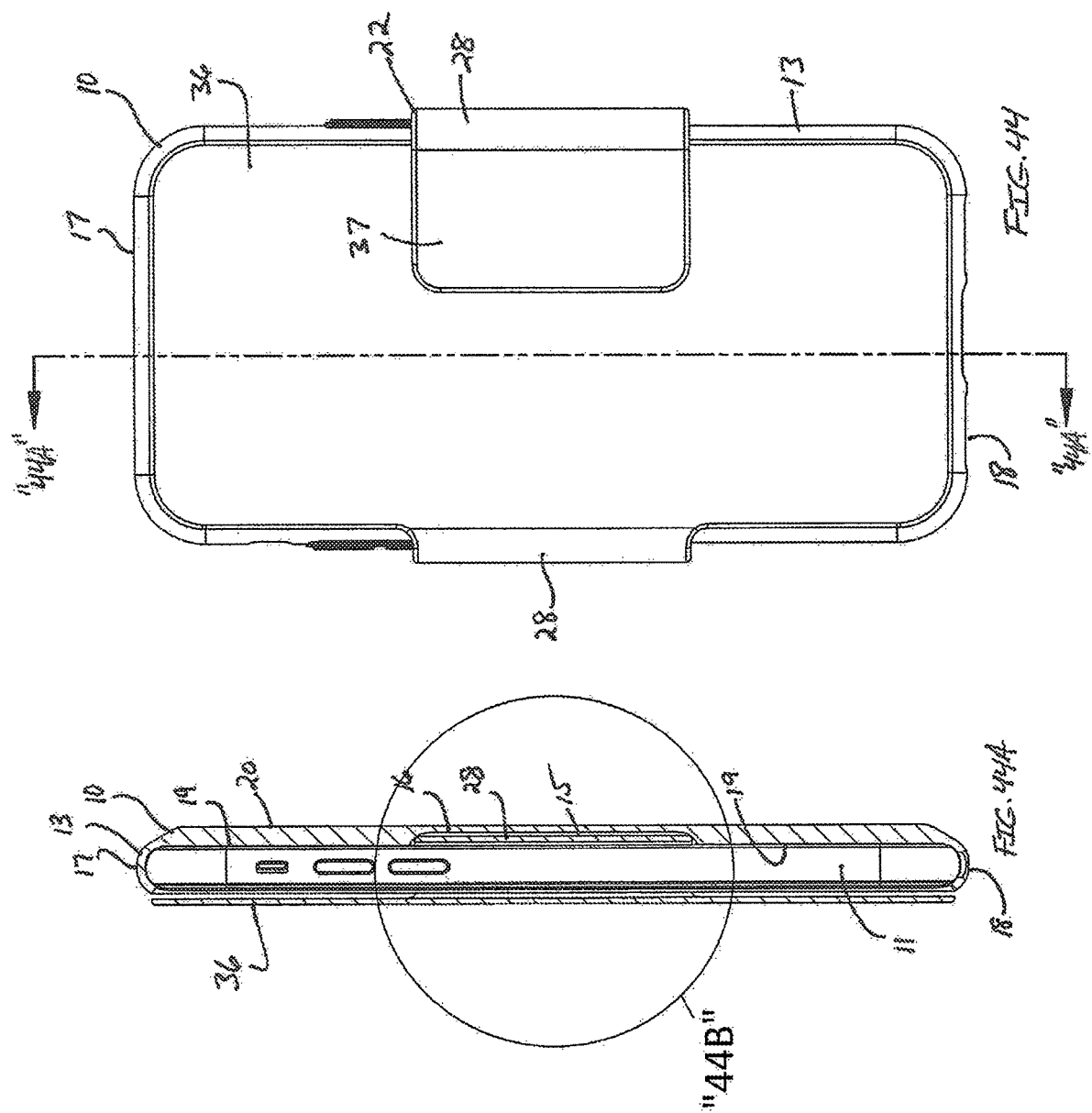

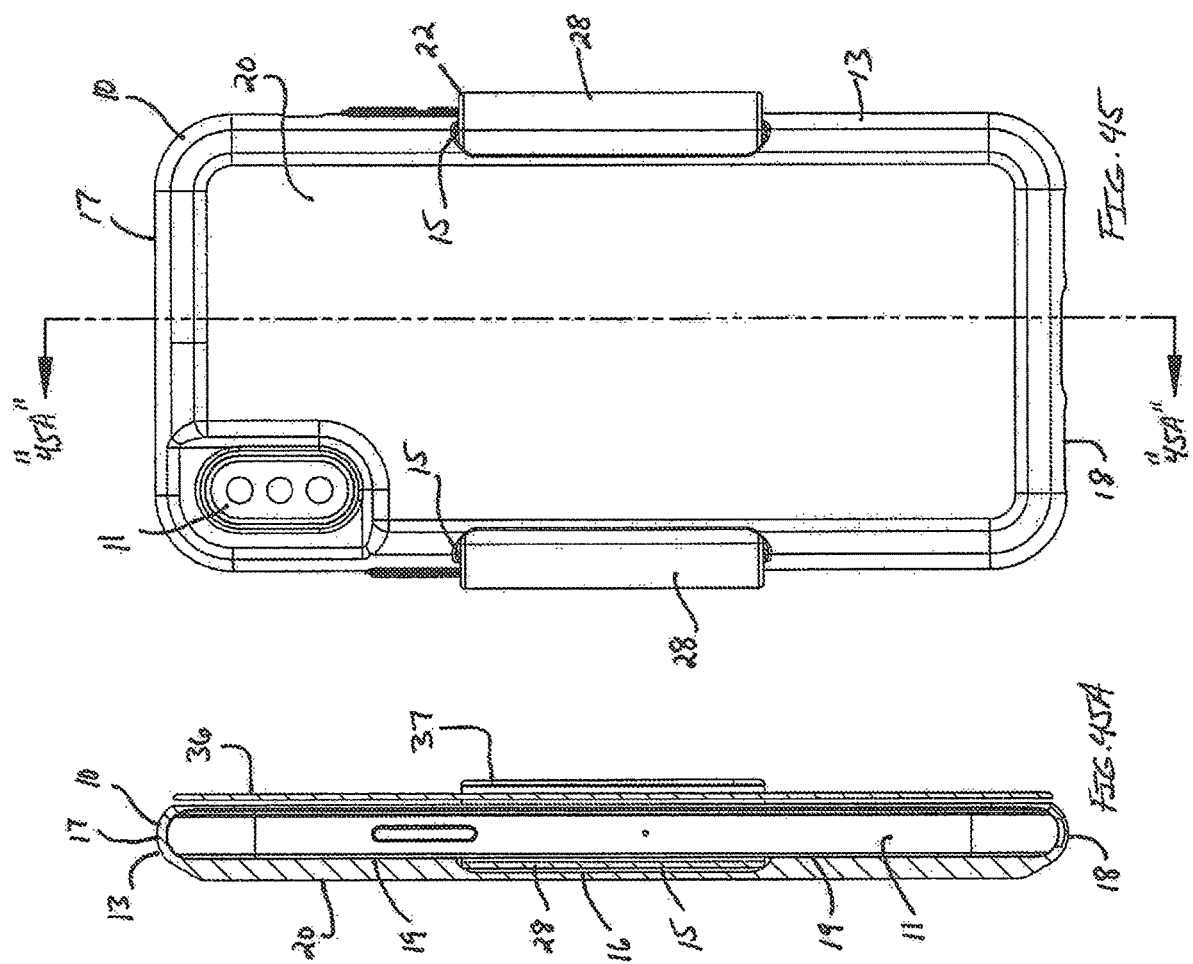

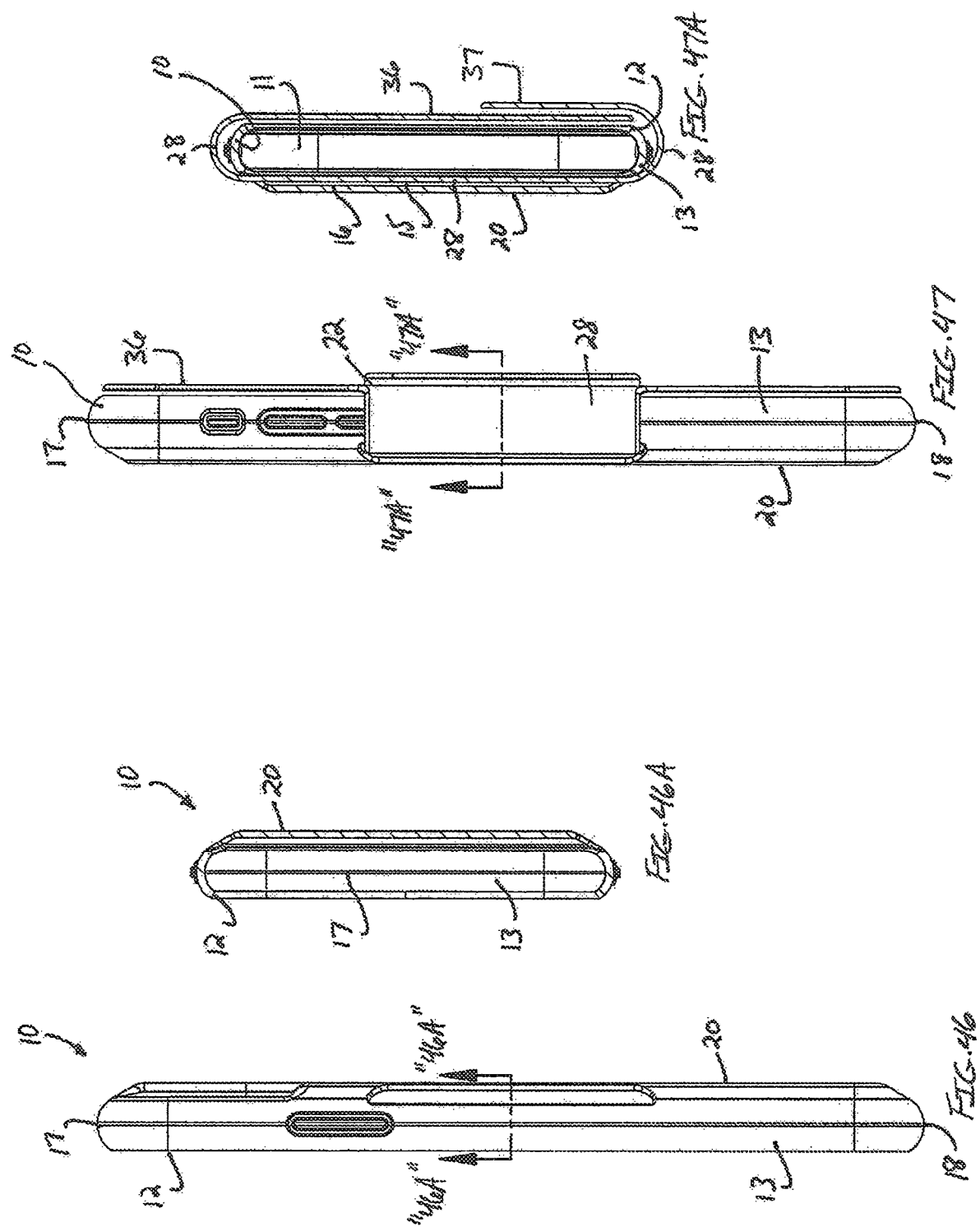

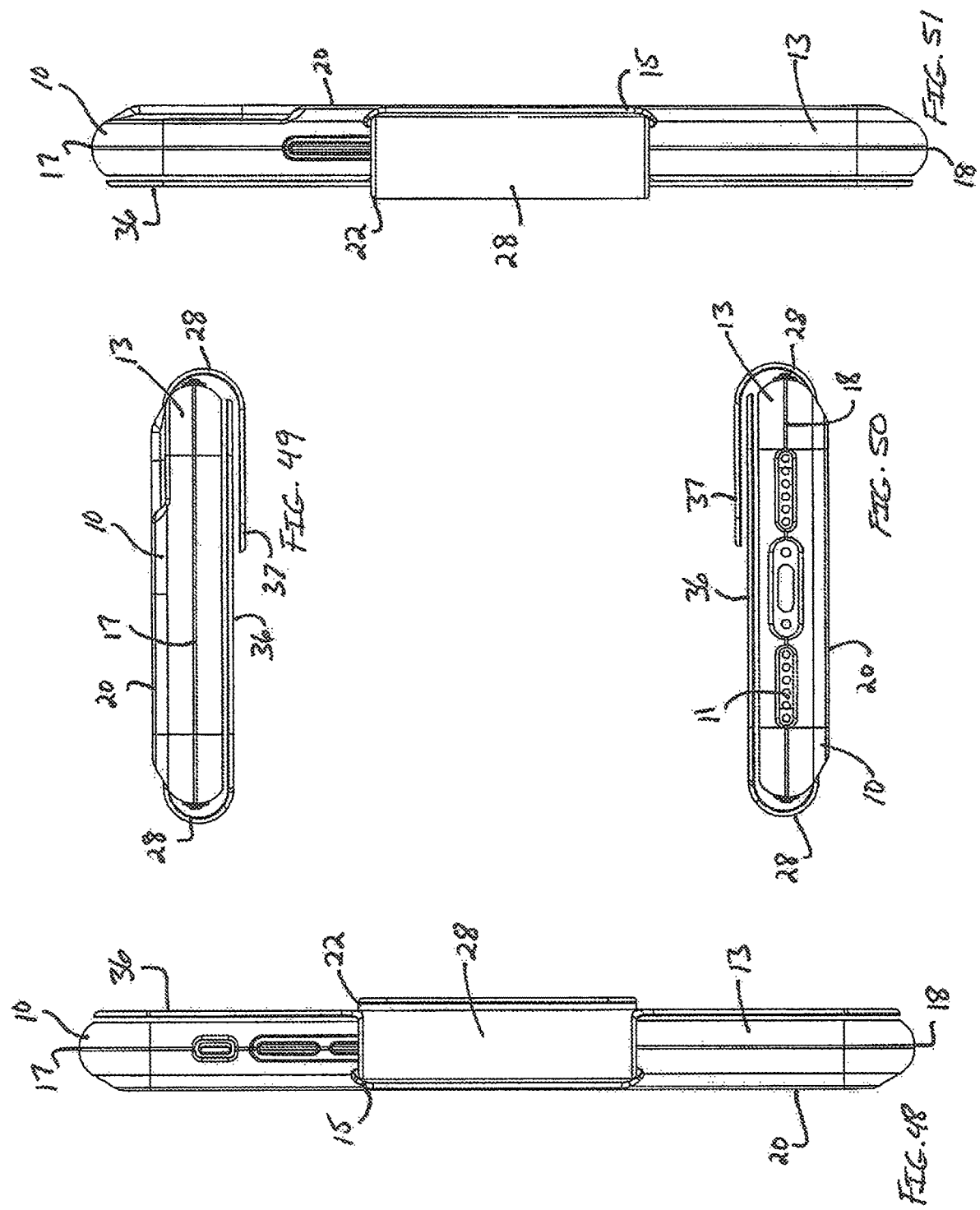

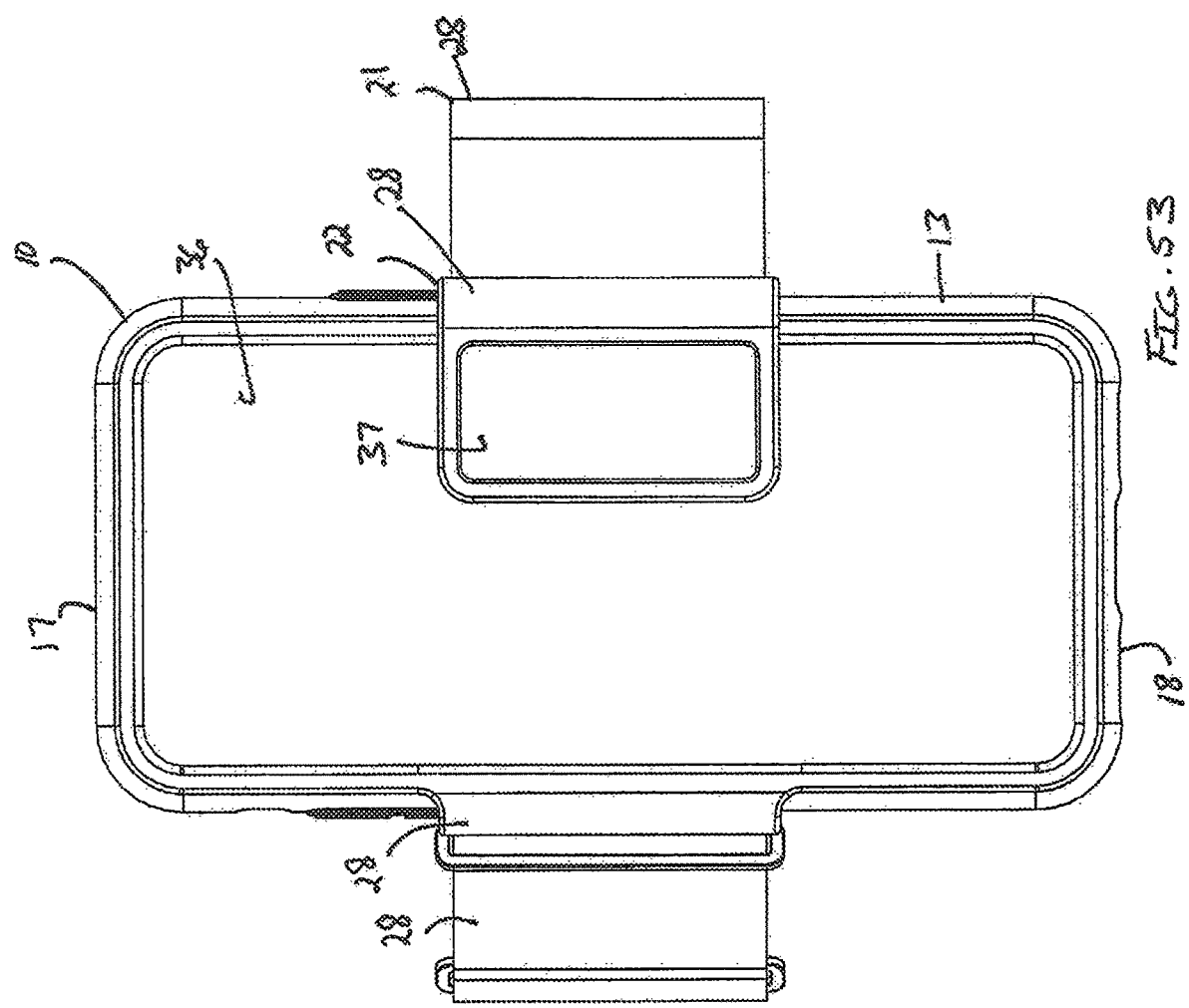

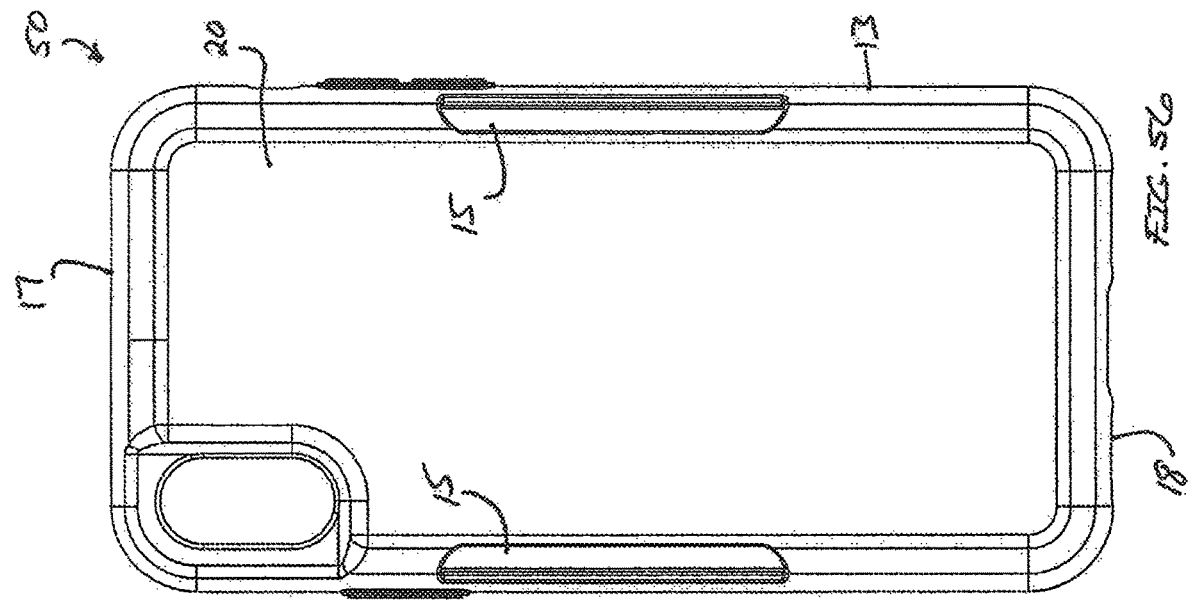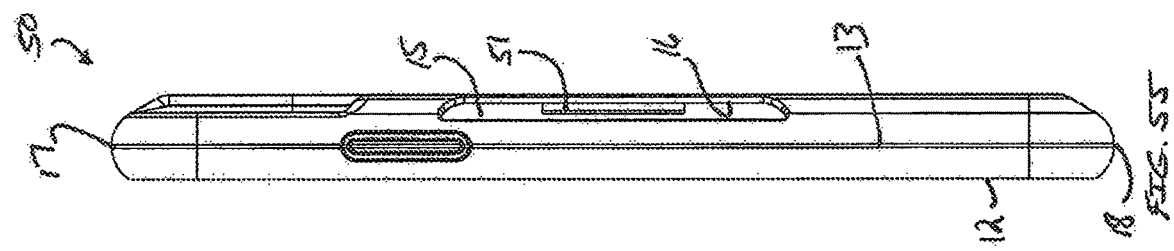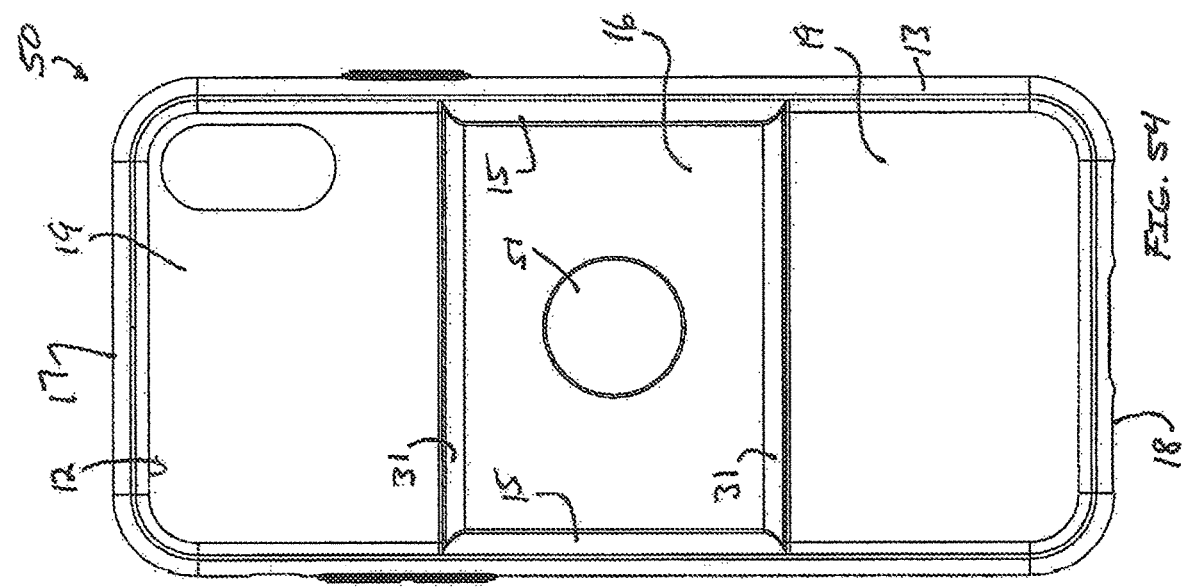

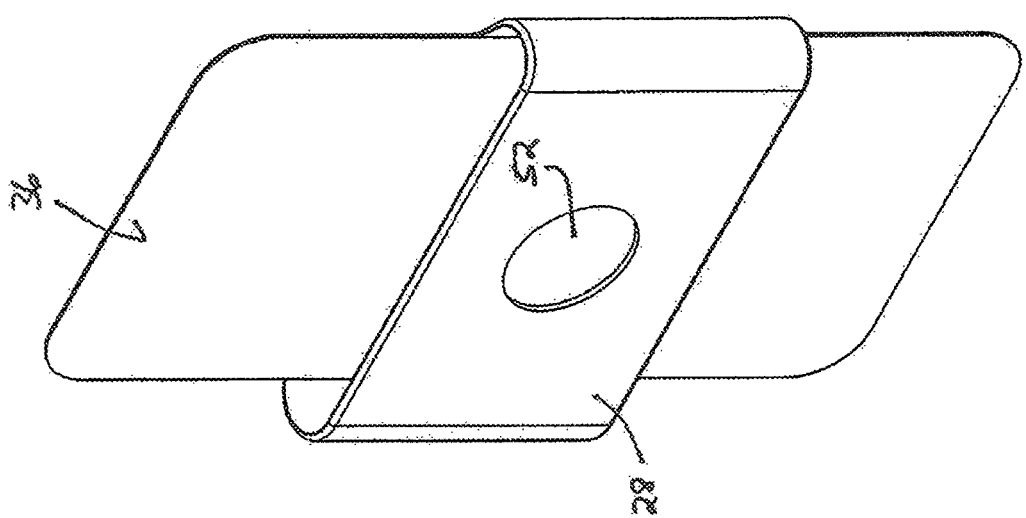
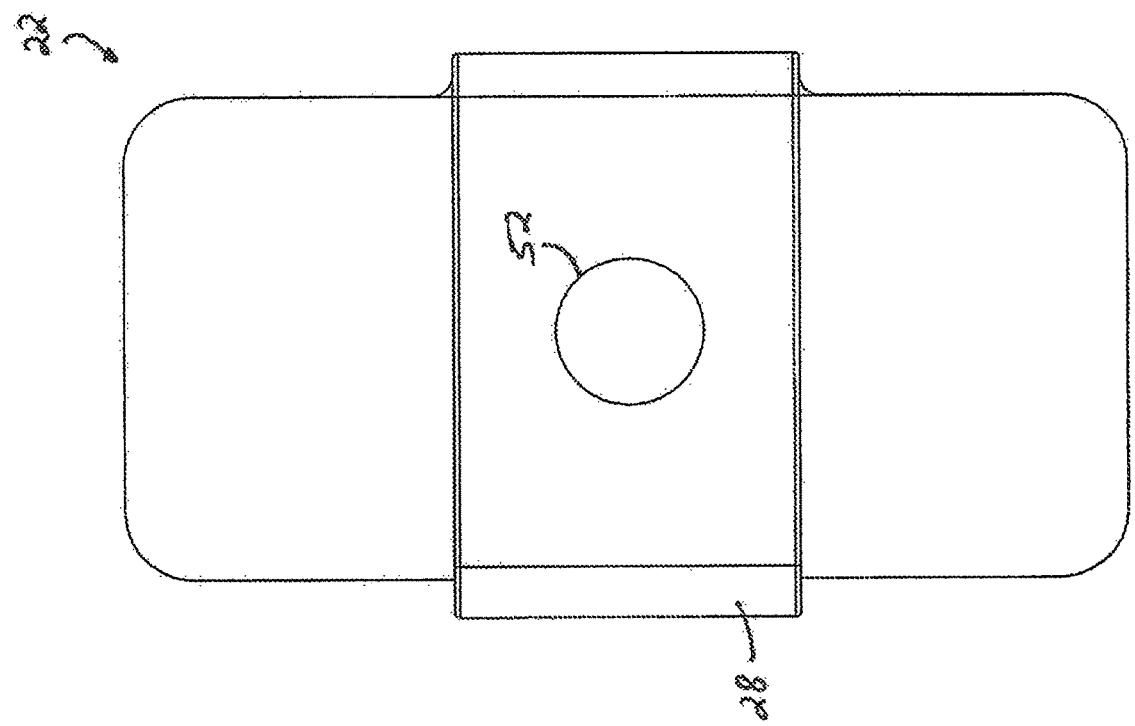

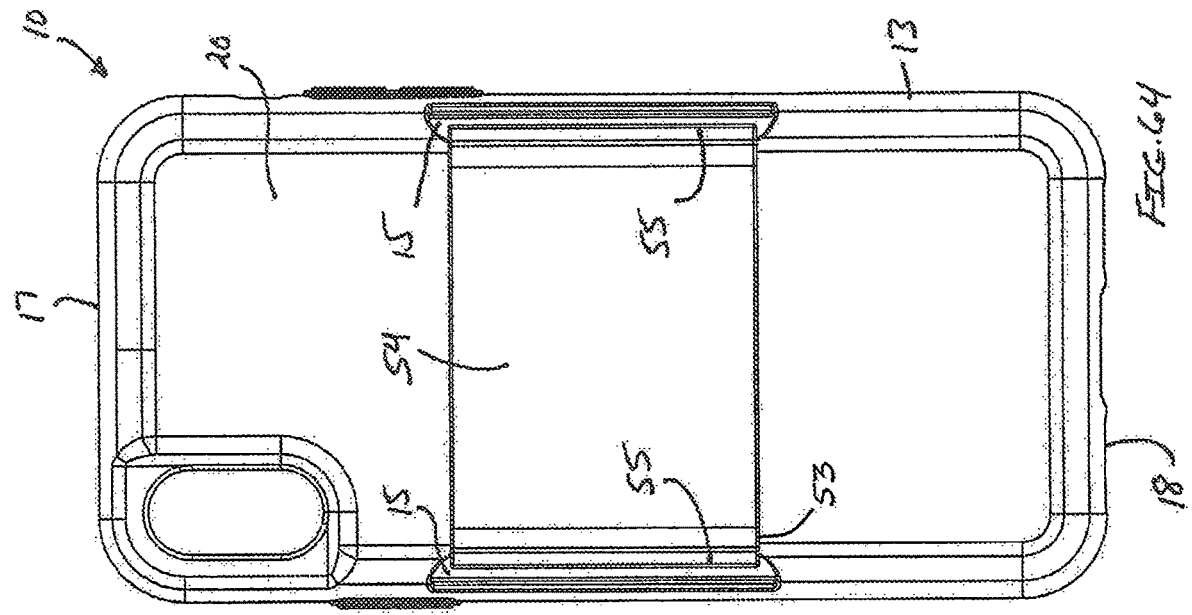
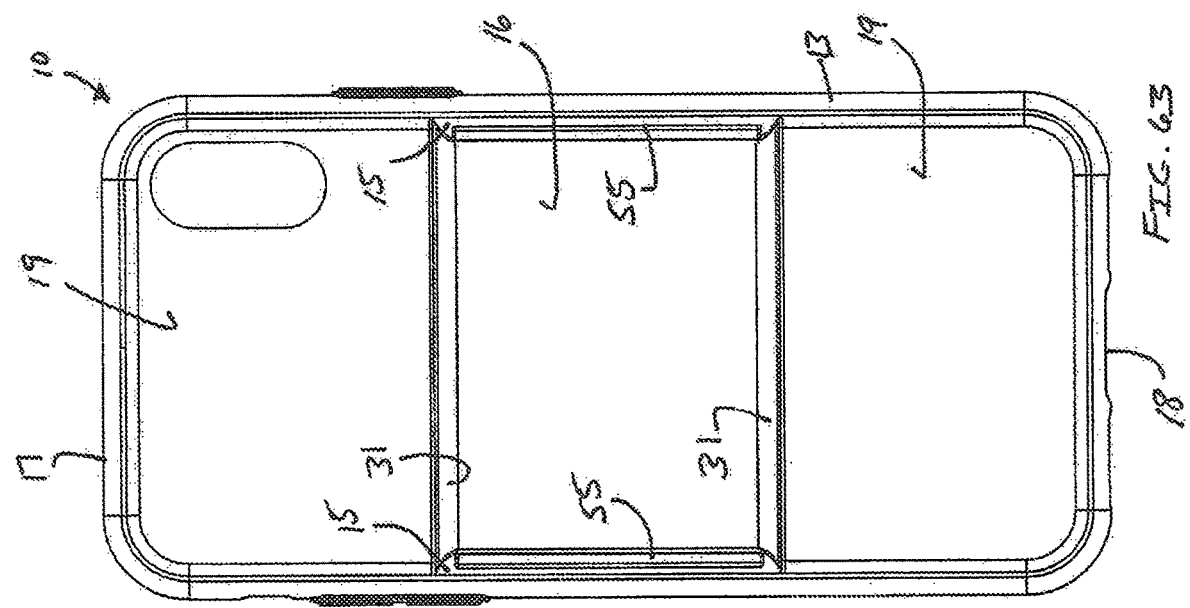

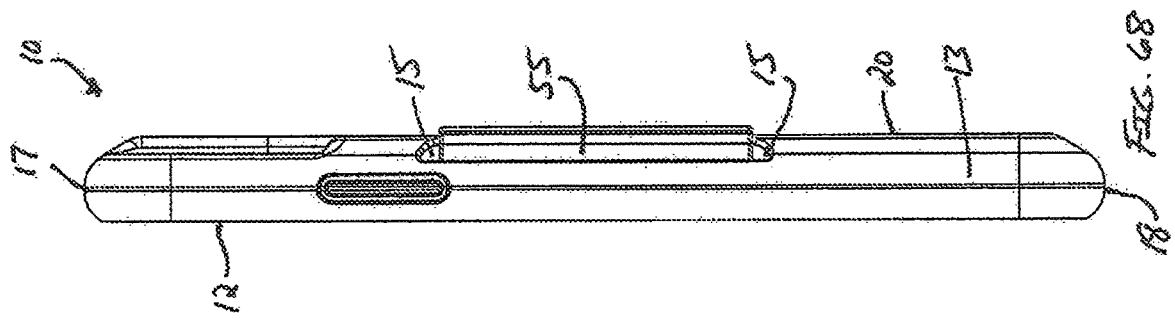
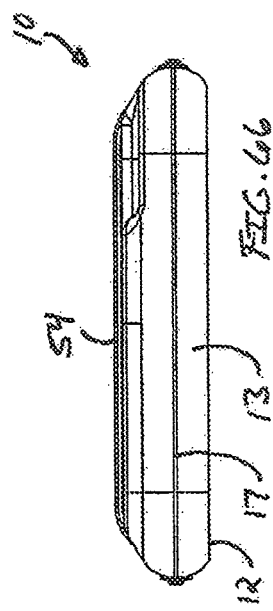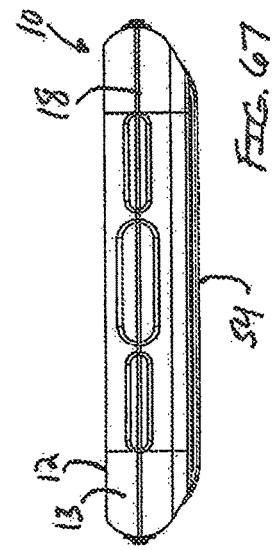
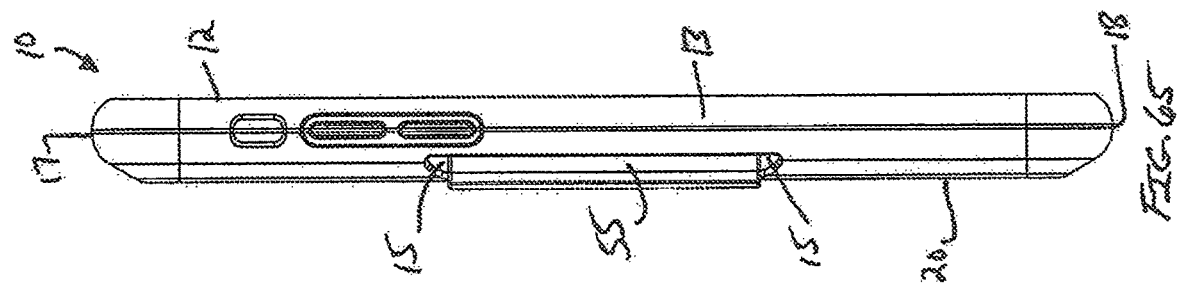

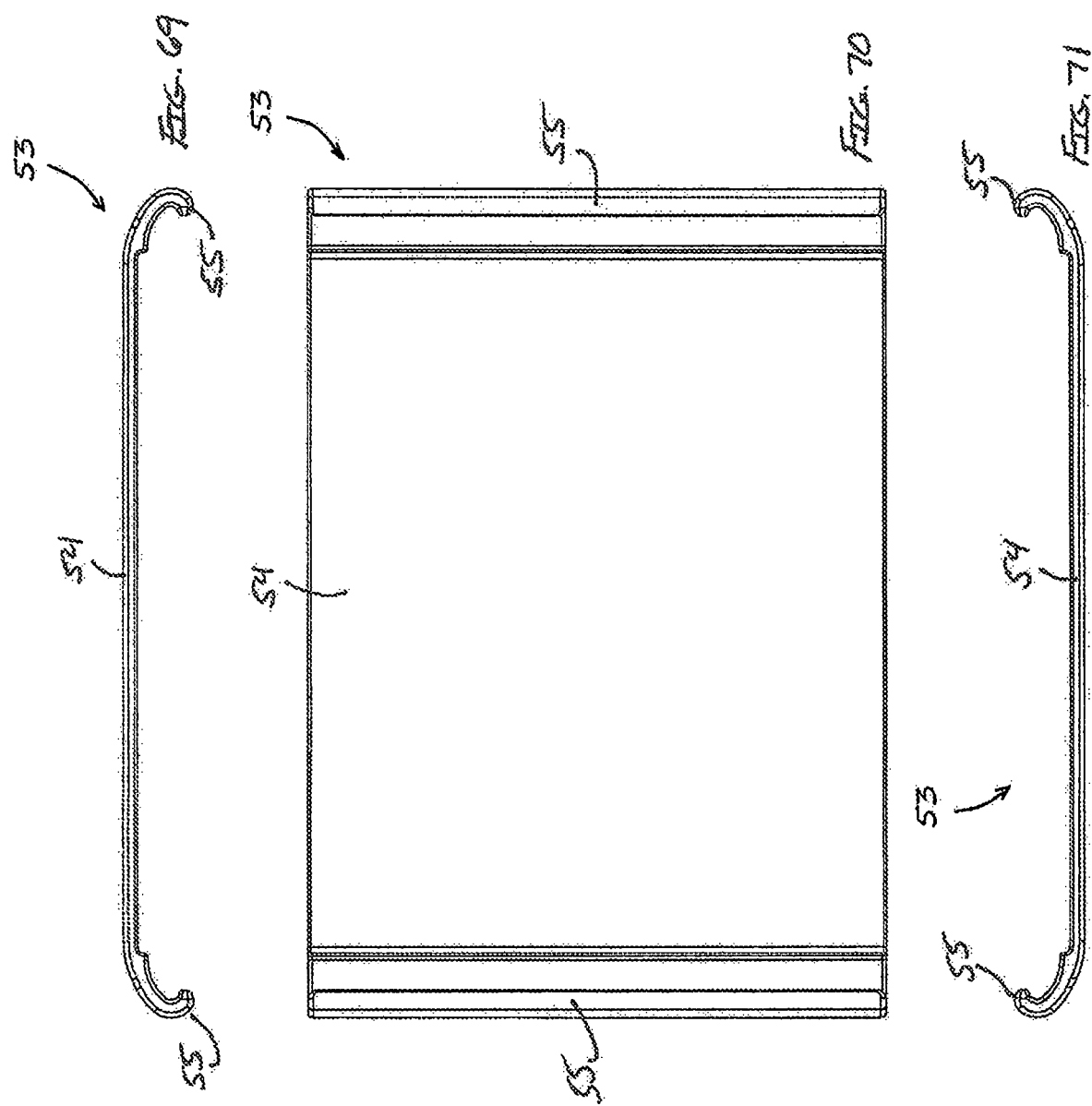

CRADLE ASSEMBLY AND FORMATION FOR A MOBILE COMMUNICATIONS DEVICE

PRIOR HISTORY

This application claims the benefit of U.S. Provisional Patent Application No. 62/679,858 filed in the United States Patent and Trademark Office (USPTO) on 3 Jun. 2018, the specifications of which are hereby incorporated by reference thereto.

BACKGROUND OF THE INVENTION

Field Of The Invention

The present invention relates generally to a cradle formation for use with a mobile communications device and more particularly to a cradle formation uniquely configured to cooperate with accessory assemblies having band portions or hooked interface portions for enhancing the functionality of the cradle formation and the mobile communications device.

SUMMARY OF THE INVENTION

Among the many objectives of this invention is the provision of a central molded case form or cradle formation with a slot and an offset depression formed therein for enabling the user to insert a strap or band through the slot that is accepted/accommodated by the offset depression. The molded case form or cradle formation is dimensioned to anteriorly receive an electronic device such as a mobile communications device (e.g. phone) thereby providing a posterior shell or encasement or cradle for the mobile communications device.

Accessory assemblies having straps or bands can thus be attached to the molded case form or cradle formation via the slot, such as armband straps or folio straps. Further, the invention contemplates being usable with a magnet-embedded band-like member that can be used to support the molded case form in angular orientations relative to a horizontal support surface, and also allow other magnetic attachment functionality such as magnetically attaching the ensemble to a vehicle mount apparatus.

The basic invention may be said to teach or disclose a cradle formation usable with a number of accessory components for forming a cradle assembly and for general use with a mobile communications device so as to enhance the functionality thereof. The cradle formation(s) according to the present invention may be said to preferably comprise an anterior device-receiving mouth, a device edge-opposing periphery portion, an anterior device back-opposing portion, and opposed accessory-letting or fastener-letting apertures.

Central to the practice of the present invention is the anterior device back-opposing portion comprising an upper planar surface extending within a flanking plane and a lower planar surface extending within a depression plane. The anterior device back-opposing portion is thereby characterized by comprising an accessory-receiving depression and opposed depression-flanking portions, which accessory-receiving depression extends in the depression plane, and which opposed depression-flanking portions extend in the flanking plane parallel to the depression plane.

The opposed accessory-letting or fastener-letting apertures are preferably positioned at opposite lateral sides of the accessory-receiving depression adjacent the device edge-opposing periphery portion and are designed to mate or structurally cooperate with a select accessory fastener assembly as exemplified by a belt clip assembly, a bike clamp assembly, a vehicular vent mount assembly, a slotted card holder assembly, a folio cover assembly, a kickstand assembly, an armband assembly, and/or combinations thereof for enhancing the functionality of the resulting cradle assembly.

The band assemblies according to the present invention may further preferably comprise a magnetic attachment mechanism (e.g. within the folio cover assembly or the kickstand assembly) for enabling a user to magnetically a select band portion to a secondary magnetic structure. In this regard, it is contemplated that magnetic portions of the band assembly may be magnetically fastened to other non-accessory-assembly magnetic structures or to other magnetic portions of the select accessory assembly.

The select fastener assembly as selected by the user is attachable to the cradle formation via the accessory-letting or fastener-letting apertures by either feeding the band portion of a select band assembly through the accessory-letting or fastener-letting apertures or by clipping hooked end portions of an interface structure into the accessory-letting or fastener-letting apertures. The selected accessory assembly is thereby attached to the cradle formation for enhancing the functionality thereof.

The band portion of banded accessory assemblies comprises a band width and a band thickness. The band portion is receivable in the accessory-receiving depression via the opposed fastener-letting apertures such that the band width extends intermediate the opposed depression-flanking portions and the band thickness extends intermediate the depression and flanking planes. The band portion thereby attaches select structure to the cradle formation dimensioned for receiving and protecting the mobile communications device. The resulting cradle assembly thereby effectively attaches the select structure to the mobile communications device.

The accessory-receiving depression may preferably comprise an optional accessory-locating post and the band portion of banded accessory assemblies may preferably comprise an optional accessory-locating aperture. The accessory-locating post and the accessory-locating aperture are matable for preventing displacements of the band portion relative to the accessory-receiving depression. An exemplary banded accessory assembly according to the present invention may preferably comprise or provide a folio cover, for example, for selectively covering the mobile communications device as received within the cradle formation.

The accessory-receiving depression may further preferably comprise opposed sloped portions adjacent the opposed depression-flanking portions. The sloped portions preferably extend obliquely relative to the depression and flanking planes in sloped portion planes. The fastener-letting apertures are each isosceles trapezoidal in form being defined in part by the parallel depression and flanking planes and the sloped portion planes.

The present invention may thus be said to very essentially provide a cradle formation for use with a mobile communications device comprising an anterior device back-opposing portion and opposed fastener-letting apertures. The anterior device back-opposing portion may be characterized by comprising an accessory-receiving depression and opposed depression-flanking portions. The accessory-receiving depression extends in a depression plane, and the opposed depression-flanking portions extend in a flanking plane parallel to the depression plane.

The opposed fastener-letting apertures are positioned at opposite lateral sides of the accessory-receiving depression. The cradle formation is dimensioned for receiving and protecting select portions of the mobile communications device, and is usable in combination with a select fastener assembly attachable to the cradle formation via the fastener-letting apertures. The select fastener assembly may preferably be a band assembly comprising a band portion for attaching a select structure to the cradle formation.

The band portion comprises a band width and a band thickness. The band portion is receivable in the accessory-receiving depression via the opposed fastener-letting apertures such that the band width extends intermediate the opposed depression-flanking portions and the band thickness extends intermediate the depression and flanking planes, the band portion for attaching a select structure to the cradle formation The accessory-receiving depression may preferably further comprise an accessory-locating post and the band portion may preferably further comprise an accessory-locating aperture. The accessory-locating post and the accessory-locating aperture are matable for preventing displacements of the band portion relative to the accessory-receiving depression.

Other secondary objects of the present invention, as well as particular features, elements, and advantages thereof, will be elucidated or become apparent from, the following brief descriptions of the drawings and the accompanying drawing figures.

BRIEF DESCRIPTIONS OF THE DRAWINGS

Other features and objectives of the invention will become more evident from a consideration of the following brief descriptions of patent drawings.

FIG. 1 is a first anterior perspective view of the preferred cradle formation for a mobile communications device according to the present invention.

FIG. 2 is a first posterior perspective view of the preferred cradle formation for a mobile communications device according to the present invention.

FIG. 3 is a first anterior plan view of the preferred cradle formation for a mobile communications device according to the present invention.

FIG. 4 is a posterior plan view of the preferred cradle formation for a mobile communications device according to the present invention.

FIG. 5 is a left lateral edge view of the preferred cradle formation for a mobile communications device according to the present invention.

FIG. 6 is a top edge view of the preferred cradle formation for a mobile communications device according to the present invention.

FIG. 7 is a bottom edge view of the preferred cradle formation for a mobile communications device according to the present invention.

FIG. 8 is a right lateral edge view of the preferred cradle formation for a mobile communications device according to the present invention.

FIG. 9 is a second anterior plan view of the preferred cradle formation for a mobile communications device according to the present invention.

FIG. 9A is a longitudinal cross-sectional view of the preferred cradle formation for a mobile communications device according to the present invention as sectioned from FIG. 9.

FIG. 10A is an enlarged, fragmentary cross-sectional view of the preferred cradle formation for a mobile communications device according to the present invention as enlarged and fragmented from FIG. 10 to show in greater clarity structure details of the preferred cradle formation.

FIG. 11 is a second anterior perspective view of the preferred cradle formation for a mobile communications device according to the present invention in exploded relation relative to a Prior Art mobile communications device.

FIG. 14 is an anterior plan view of a Prior Art mobile communications device usable in combination with the preferred cradle formation according to the present invention.

FIG. 15 is a posterior plan view of the preferred cradle formation for a mobile communications device according to the present invention cradling a Prior Art mobile communications device.

FIG. 16 is a left lateral edge view of the preferred cradle formation holding or cradling a mobile communications device according to the present invention.

FIG. 17 is a top edge view of the preferred cradle formation holding or cradling a mobile communications device according to the present invention.

FIG. 18 is a bottom edge view of the preferred cradle formation holding or cradling a mobile communications device according to the present invention cradling a Prior Art mobile communications device.

FIG. 19 is a right lateral edge view of the preferred cradle formation holding or cradling a mobile communications device according to the present invention.

FIG. 20 is a posterior plan view of a first cradle assembly for a mobile communications device according to the present invention showing the preferred cradle formation cradling a Prior Art mobile communications device and portions of first and second accessory assemblies according to the present invention.

FIG. 21 is a right lateral edge view of the first cradle assembly for a mobile communications device according to the present invention showing the preferred cradle formation and portions of first and second accessory assemblies according to the present invention.

FIG. 22 is a left lateral edge view of the first cradle assembly for a mobile communications device according to the present invention showing the preferred cradle formation and portions of first and second accessory assemblies according to the present invention.

FIG. 23 is a top edge view of the first cradle assembly for a mobile communications device according to the present invention showing the preferred cradle formation and portions of first and second accessory assemblies according to the present invention.

FIG. 24 is a bottom edge view of the first cradle assembly for a mobile communications device according to the present invention showing the preferred cradle formation cradling a Prior Art mobile communications device and portions of first and second accessory assemblies according to the present invention.

FIG. 25 is a first edge view of a first accessory assembly according to the present invention, namely, an armband assembly.

FIG. 25A is an enlarged fragmentary sectional view as enlarged, fragmented, and sectioned from FIG. 25 to highlight in greater detail the band thickness of the band portion of the armband assembly otherwise depicted in FIG. 25.

FIG. 26 is a second edge view of the first accessory assembly or armband assembly according to the present invention.

FIG. 27 is a posterior view of the first accessory assembly or armband assembly according to the present invention.

FIG. 28 is a right end view of the first accessory assembly or armband assembly according to the present invention.

FIG. 29 is an anterior view of the first accessory assembly or armband assembly according to the present invention.

FIG. 30 is a left end view of the first accessory assembly or armband assembly according to the present invention.

FIG. 36 is a right lateral edge view of the second accessory assembly or folio cover assembly according to the present invention.

FIG. 37 is a top edge view of the second accessory assembly or folio cover assembly according to the present invention.

FIG. 38 is a bottom edge view of the second accessory assembly or folio cover assembly according to the present invention.

FIG. 39 is a left lateral edge view of the second accessory assembly or folio cover assembly according to the present invention.

FIG. 40 is an anterior perspective view of a second cradle assembly according to the present invention showing in combination the preferred cradle formation and the second accessory assembly or folio cover assembly.

FIG. 41 is a posterior perspective view of the second cradle assembly according to the present invention showing in combination the preferred cradle formation cradling a Prior Art mobile communications device and the second accessory assembly or folio cover assembly.

FIG. 44 is a second anterior plan view of the second cradle assembly according to the present invention showing in combination the preferred cradle formation and the second accessory assembly or folio cover assembly.

FIG. 44A is a longitudinal cross-sectional view of the second cradle assembly according to the present invention as sectioned from FIG. 44.

FIG. 45 is a second posterior plan view of the second cradle assembly according to the present invention showing in combination the preferred cradle formation cradling a Prior Art mobile communications device and the second accessory assembly or folio cover assembly.

FIG. 45A is a longitudinal cross-sectional view of the second cradle assembly according to the present invention as sectioned from FIG. 45.

FIG. 46 is a second right lateral edge view of the preferred cradle formation according to the present invention showing.

FIG. 46A is a latitudinal cross-sectional view of the preferred cradle formation according to the present invention as sectioned from FIG. 46.

FIG. 47 is a first left lateral edge view of the second cradle assembly according to the present invention showing in combination the preferred cradle formation and the second accessory assembly or folio cover assembly.

FIG. 47A is a latitudinal cross-sectional view of the second cradle assembly according to the present invention as sectioned from FIG. 47.

FIG. 48 is a second left lateral edge view of the second cradle assembly according to the present invention showing in combination the preferred cradle formation and the second accessory assembly or folio cover assembly.

FIG. 49 is a top edge view of the second cradle assembly according to the present invention showing in combination the preferred cradle formation and the second accessory assembly or folio cover assembly.

FIG. 50 is a bottom edge view of the second cradle assembly according to the present invention showing in combination the preferred cradle formation cradling a Prior Art mobile communications device and the second accessory assembly or folio cover assembly.

FIG. 51 is a right lateral edge view of the second cradle assembly according to the present invention showing in combination the preferred cradle formation and the second accessory assembly or folio cover assembly.

FIG. 53 is an anterior plan view the first cradle assembly for a mobile communications device according to the present invention.

FIG. 54 is an anterior plan view of an alternative cradle formation according to the present invention.

FIG. 55 is a right lateral edge view of the alternative cradle formation according to the present invention.

FIG. 56 is a posterior plan view of the alternative cradle formation according to the present invention.

FIG. 57 is a posterior plan view of a second accessory assembly or folio cover assembly according to the present invention outfitted with an optional accessory-locating aperture.

FIG. 58 is a posterior perspective view of the second accessory assembly or folio cover assembly according to the present invention outfitted with the optional accessory-locating aperture.

Figures 59, 59A, 60, 60A:
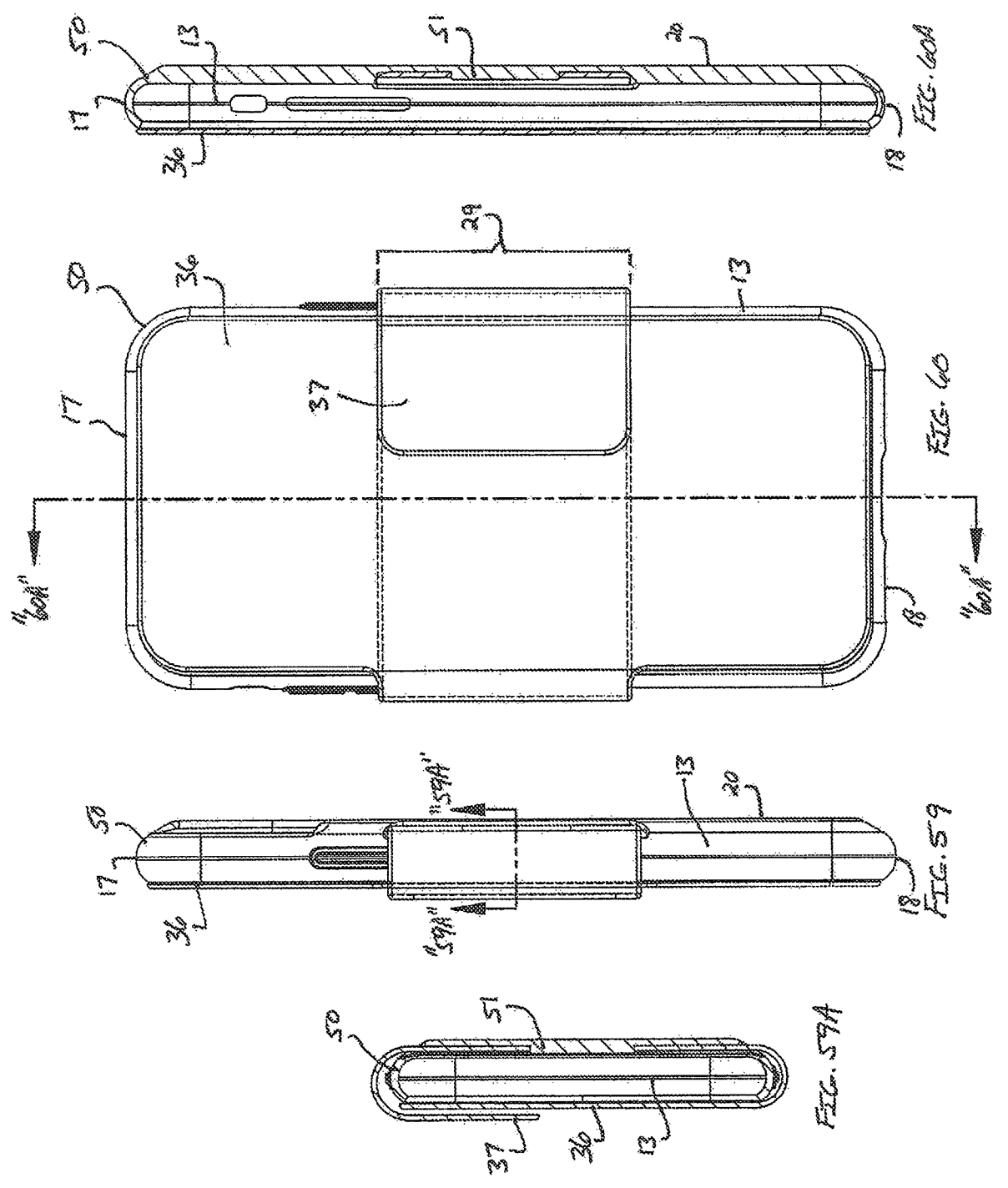

FIG. 59 is a right lateral edge view of the second cradle assembly according to the present invention showing in combination the alternative cradle formation and the second accessory assembly or folio cover assembly outfitted with the optional accessory-locating aperture.

FIG. 59A is a latitudinal cross-sectional view of the second cradle assembly according to the present invention as sectioned from FIG. 59.

FIG. 60 is a second anterior plan view of the second cradle assembly according to the present invention showing in combination the alternative cradle formation and the second accessory assembly or folio cover assembly outfitted with the optional accessory-locating aperture.

FIG. 60A is a longitudinal cross-sectional view of the second cradle assembly according to the present invention as sectioned from FIG. 60.

FIG. 63 is an anterior plan view of the preferred cradle formation outfitted with a generic attachment interface structure according to the present invention.

FIG. 64 is a posterior plan view of the preferred cradle formation outfitted with the generic attachment interface structure according to the present invention.

FIG. 65 is a left lateral edge view of the preferred cradle formation outfitted with the generic attachment interface structure according to the present invention.

FIG. 66 is a top edge view of the preferred cradle formation outfitted with the generic attachment interface structure according to the present invention.

FIG. 67 is a bottom edge view of the preferred cradle formation outfitted with the generic attachment interface structure according to the present invention.

FIG. 68 is a right lateral edge view of the preferred cradle formation outfitted with the generic attachment interface structure according to the present invention.

FIG. 69 is a first edge view of the generic attachment interface structure according to the present invention.

FIG. 70 is an anterior plan view of the generic attachment interface structure according to the present invention.

FIG. 71 is a second edge view of the generic attachment interface structure according to the present invention.

Figure 76:
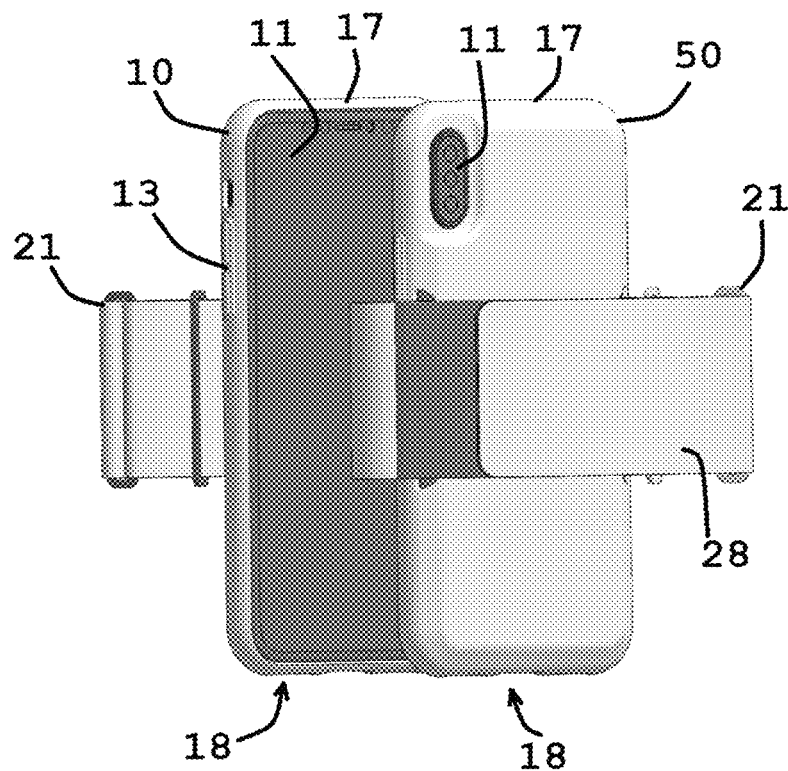

FIG. 76 is a perspective view of two third cradle assemblies according to the present invention, a first of the two third cradle assemblies being shown from an anterior perspective with a mobile communications device and the second of the two third cradle assemblies being shown from a posterior perspective and positioned in front of the first of two third cradle assemblies partially obscuring right most portions thereof.

Figure 77:
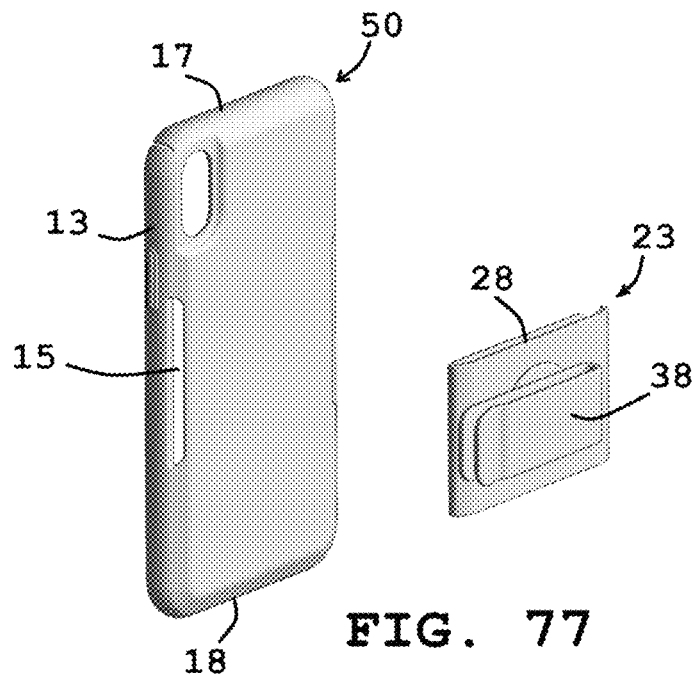

FIG. 77 is an exploded posterior perspective view of a fourth cradle assembly according to the present invention showing the alternative cradle formation and a third accessory assembly or belt clip assembly.

Figure 78:
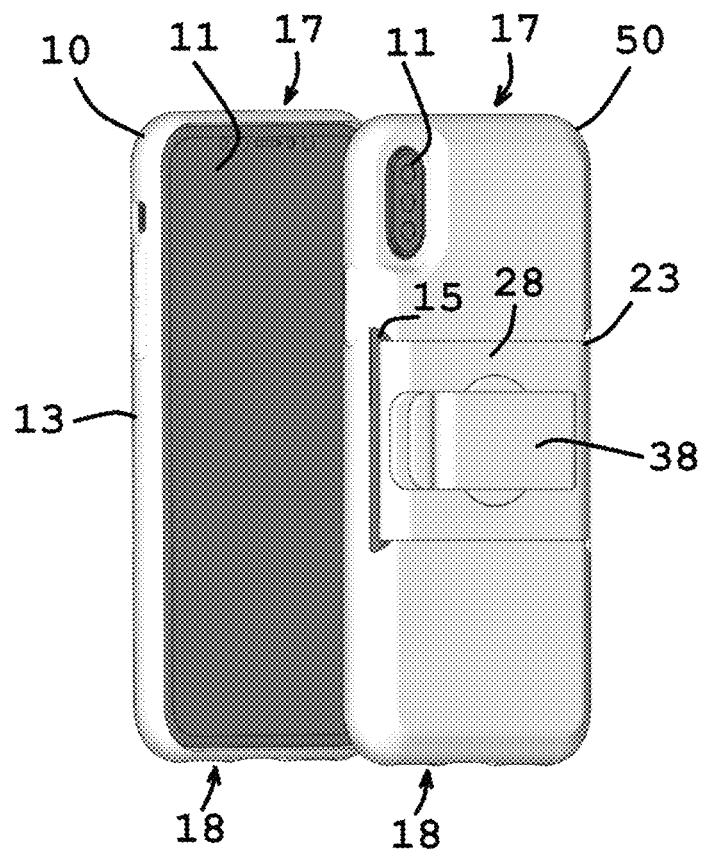

FIG. 78 is a perspective view of two fourth cradle assemblies according to the present invention, a first of the two fourth cradle assemblies being shown from an anterior perspective with a mobile communications device and the second of the two fourth cradle assembles being shown from a posterior perspective and positioned in front of the first of two fourth cradle assemblies partially obscuring right most portions thereof.

Figure 79:
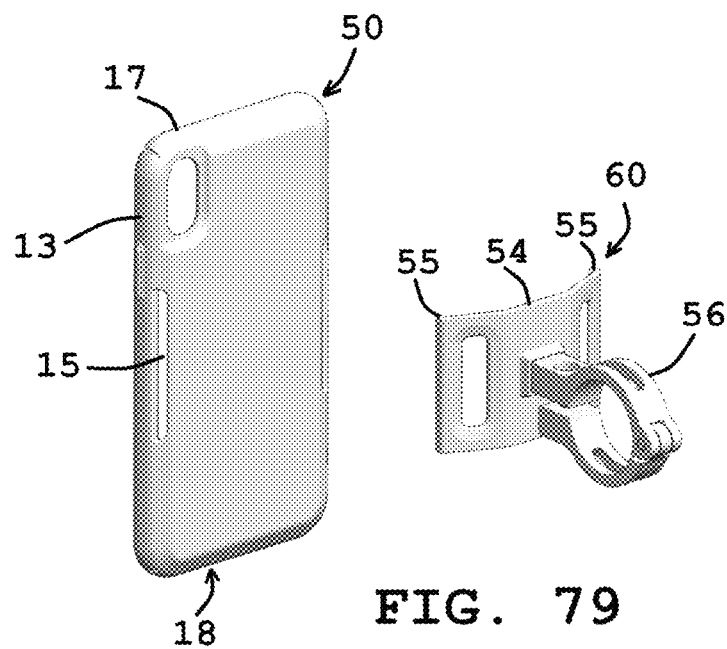

FIG. 79 is an exploded posterior perspective view of a fifth cradle assembly according to the present invention showing the alternative cradle formation and a fourth accessory assembly or bicycle clamp assembly.

Figure 80:
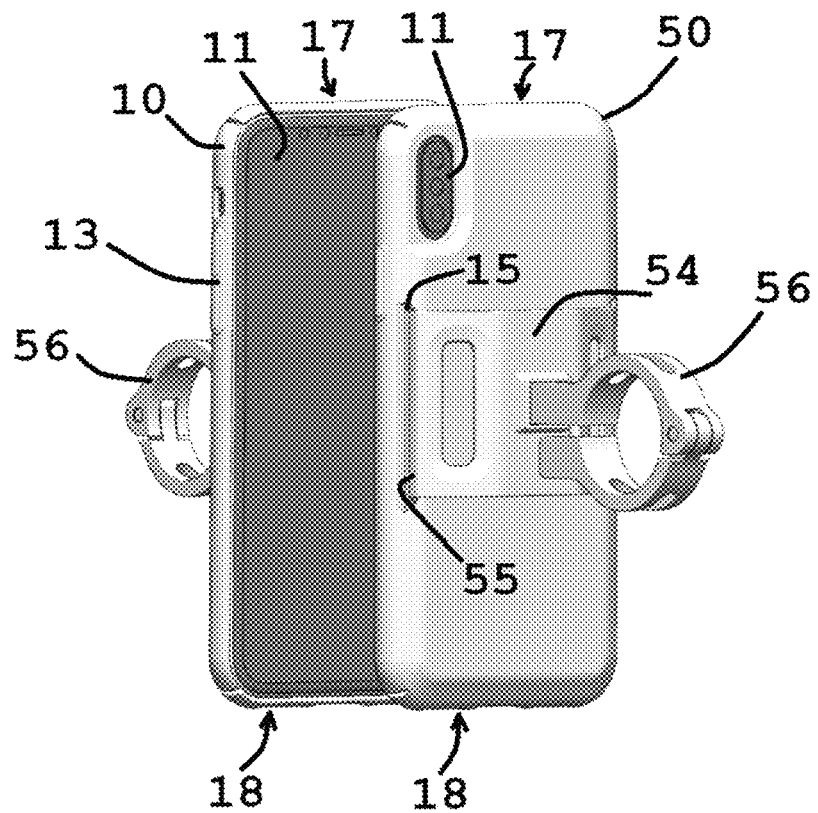

FIG. 80 is a perspective view of two fifth cradle assemblies according to the present invention, a first of the two fifth cradle assemblies being shown from an anterior perspective with a mobile communications device and the second of the two fifth cradle assemblies being shown from a posterior perspective and positioned in front of the first of two fifth cradle assemblies partially obscuring right most portions thereof.

Figure 81:
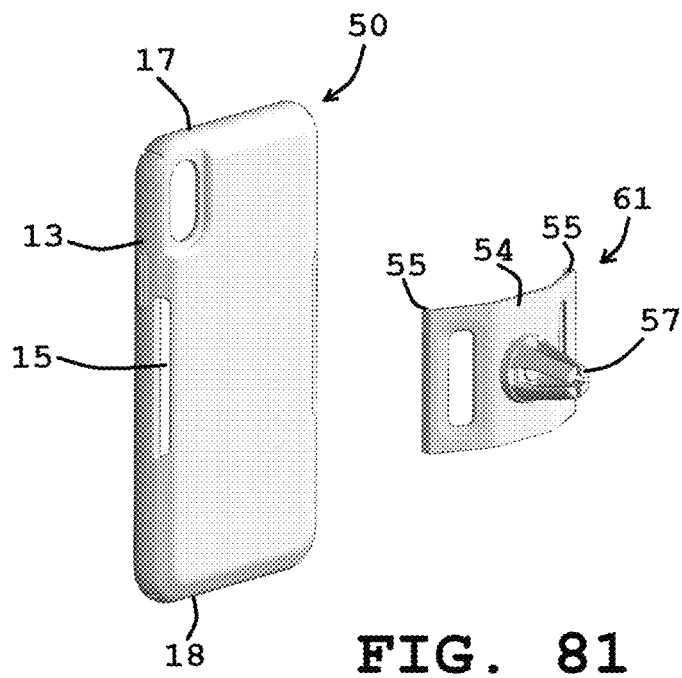

FIG. 81 is an exploded posterior perspective view of a sixth cradle assembly according to the present invention showing the alternative cradle formation and a fifth accessory assembly or vehicular vent mount assembly.

Figure 82:
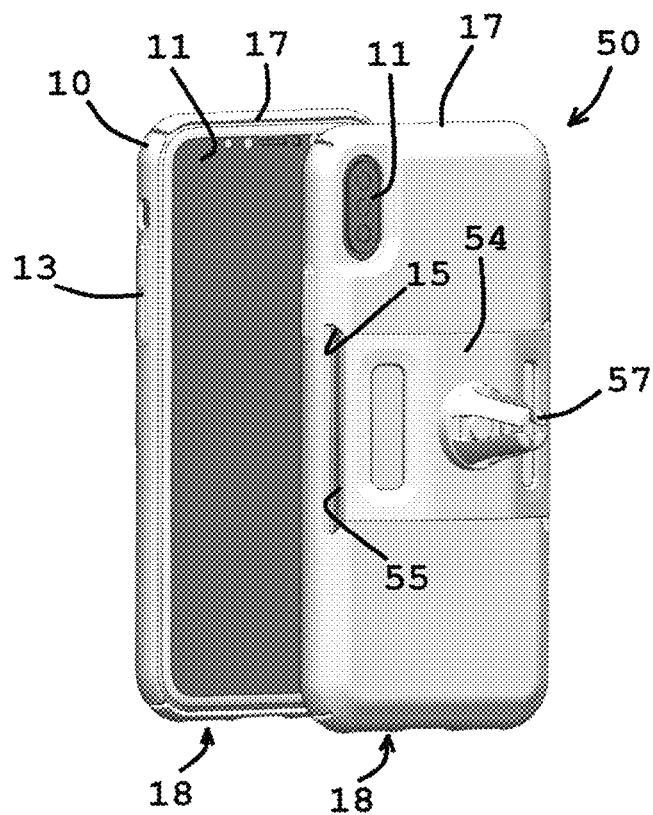

FIG. 82 is a perspective view of two sixth cradle assemblies according to the present invention, a first of the two sixth cradle assemblies being shown from an anterior perspective with a mobile communications device and the second of the two sixth cradle assemblies being shown from a posterior perspective and positioned in front of the first of two sixth cradle assemblies partially obscuring right most portions thereof.

Figure 83:
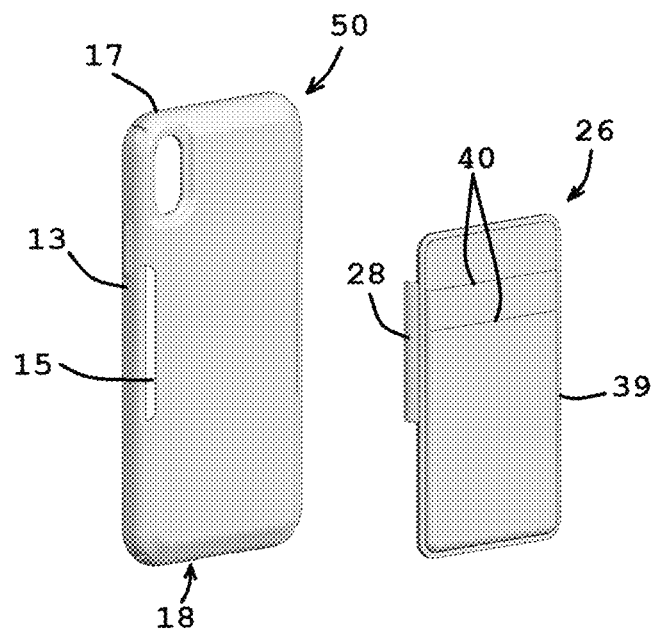

FIG. 83 is an exploded posterior perspective view of a seventh cradle assembly according to the present invention showing the alternative cradle formation and a sixth accessory assembly or slotted card-holding assembly.

Figure 84:
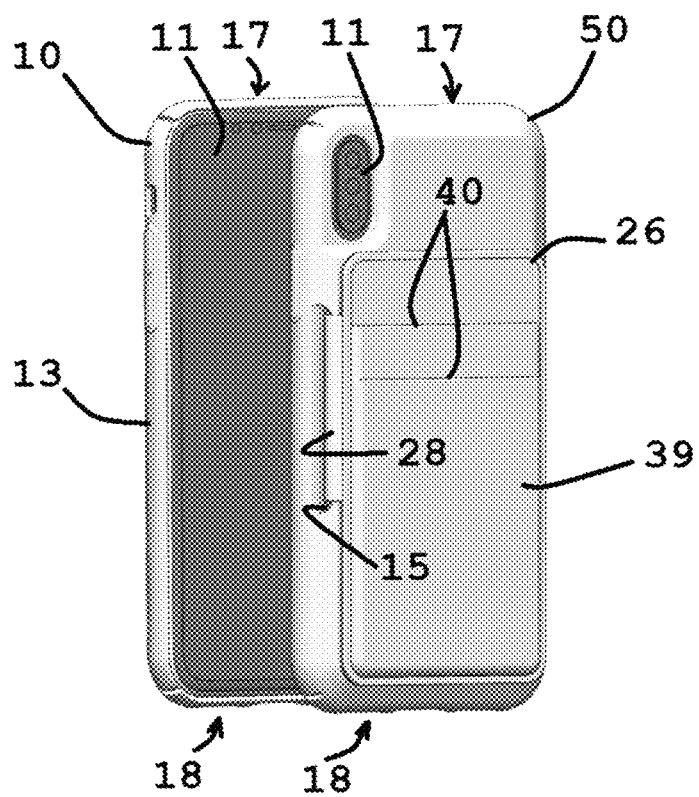

FIG. 84 is a perspective view of two seventh cradle assemblies according to the present invention, a first of the two seventh cradle assemblies being shown from an anterior perspective with a mobile communications device and the second of the two seventh cradle assembles being shown from a posterior perspective and positioned in front of the first of two seventh cradle assemblies partially obscuring right most portions thereof.

Figure 85:
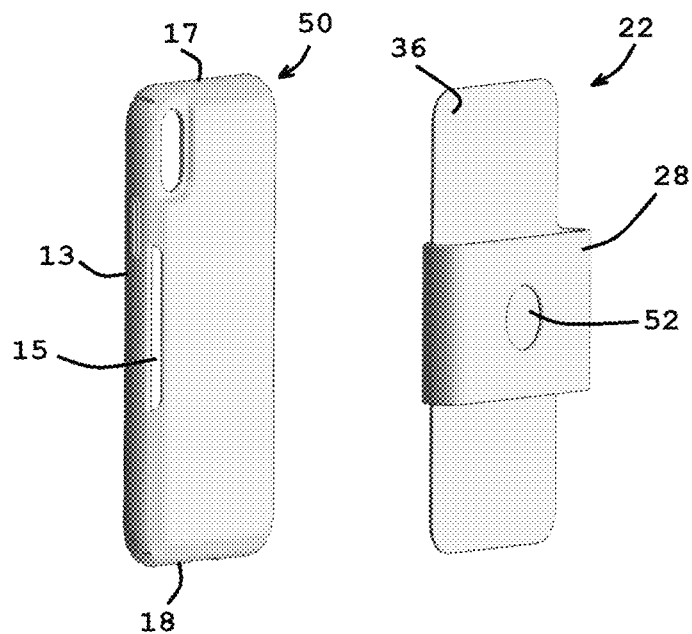

FIG. 85 is an exploded posterior perspective view of the second cradle assembly according to the present invention showing the alternative cradle formation and the second accessory assembly or folio cover assembly.

Figure 86:
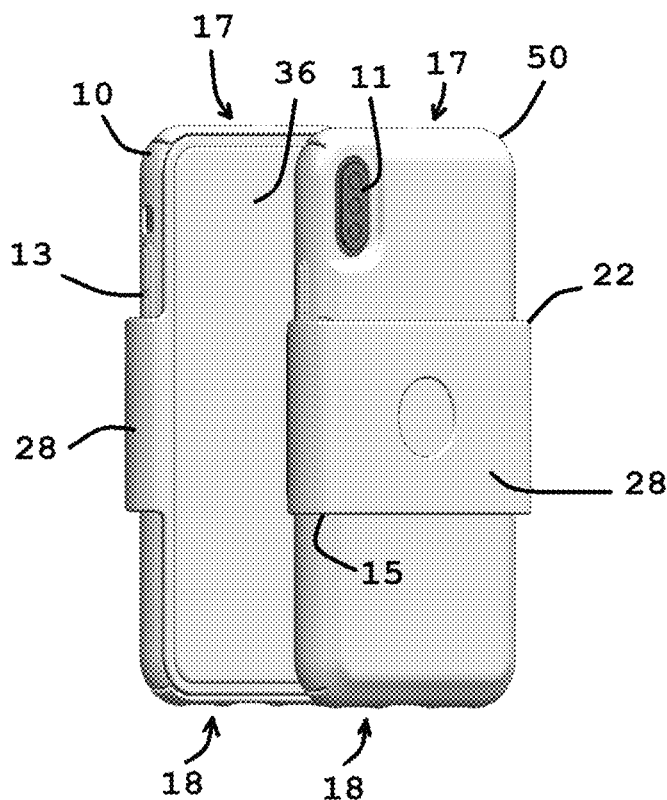

FIG. 86 is a perspective view of two second cradle assemblies according to the present invention, a first of the two second cradle assemblies being shown from an anterior perspective and the second of the two second cradle assembles being shown from a posterior perspective and positioned in front of the first of two second cradle assemblies partially obscuring right most portions thereof.

Figure 87:
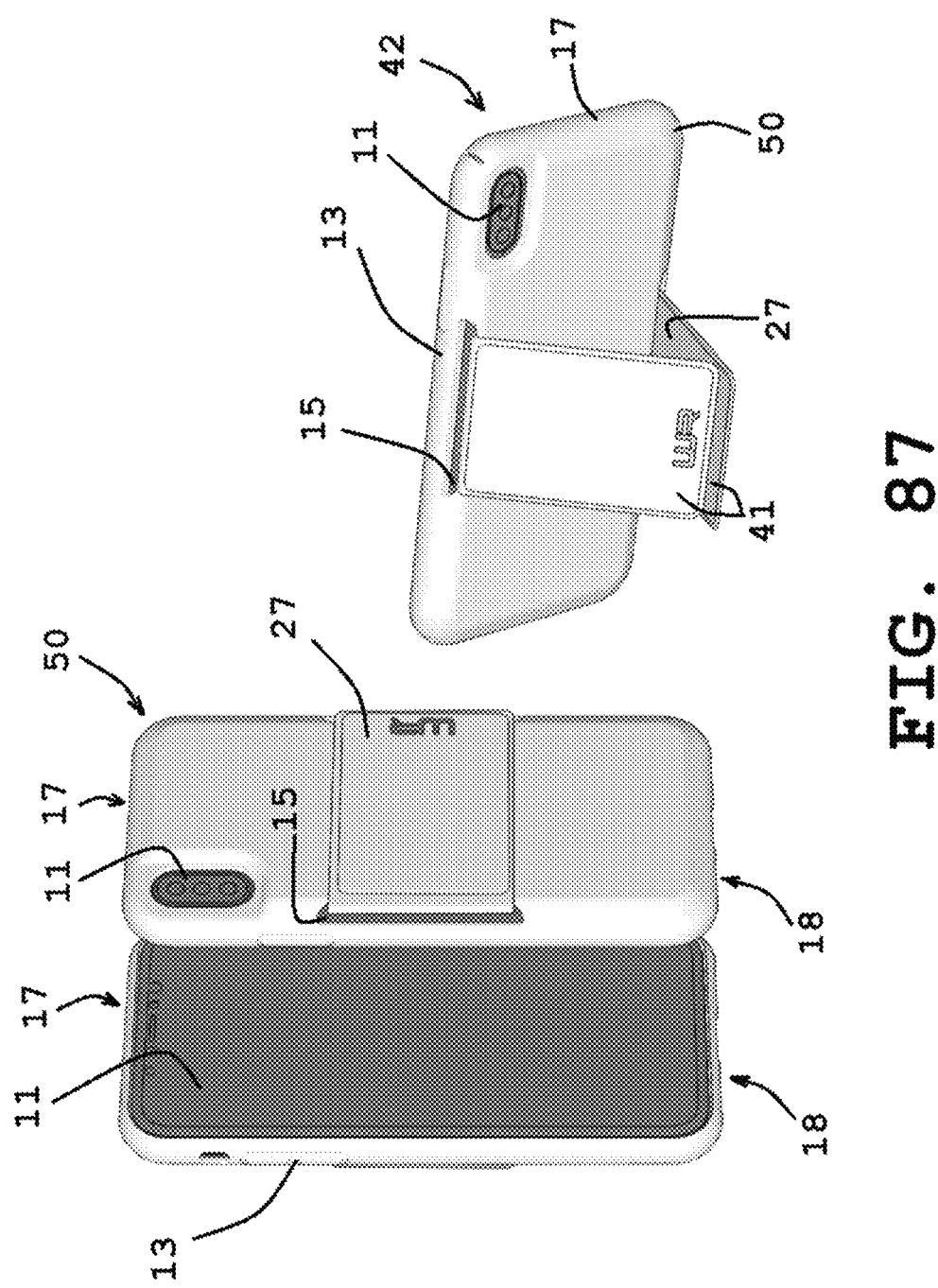

FIG. 87 is a perspective view of three eighth cradle assemblies according to the present invention, a first of the three eighth cradle assemblies being shown from an anterior perspective with a mobile communications device; the second of the three eighth cradle assembles being shown from a posterior perspective and positioned in front of the first of three eighth cradle assemblies partially obscuring right most portions thereof; the third of the three eighth cradle assembles being shown from a posterior perspective in a device display condition of use and positioned in front of the second of three eighth cradle assemblies partially obscuring lower right portions thereof.

DETAILED DESCRIPTION OF THE PREFERRED EMBODIMENTS

Referring now to the drawings with more specificity, the following specifications generally describe a preferred cradle formation 10 and alternative cradle formation 50 usable in combination with a number of cradle accessory assemblies for further use with a mobile communications device as at 11. In other words, the cradle formations 10 and 50 are preferably formed and dimensioned for receiving, cradling, and protecting a mobile communications device 11 exemplified by a smart phone, tablet computer, or similar other device, and are formed so as to structurally cooperate with a number of accessory assemblies according to the present invention for providing the user with enhanced accessory functionality according to users' needs.

The cradle formations 10 and 50 according to the present invention each preferably comprise an anterior device-receiving mouth as at 12; a device edge-opposing periphery portion as at 13; an anterior device back-opposing portion 14; opposed accessory-letting or fastener-letting apertures as at 15; and a posterior surface as at 20. The anterior device back-opposing portion 14 is particularly configured, and characterized by comprising an accessory-receiving depression 16 preferably intermediate the length of the cradle formations 10 and 50 equidistant from the top edge 17 and bottom edge 18 of the cradle formations 10 and 50.

Opposed depression-flanking portions 19 extend from the accessory-receiving depression 16 to the top edge 17 and bottom edge 18, respectively. The accessory-receiving depression 16 has upper planar depression surfacing that extends in a depression plane as at 100, and the opposed depression-flanking portions 19 have upper planar flank surfacing that extends in a flanking plane as at 101. The depression and flanking planes 100 and 101 are preferably parallel to one another. The posterior surface 20 may further preferably extend in a posterior surface plane 102 parallel to the depression and flanking planes 100 and 101. The opposed accessory-letting or fastener-letting apertures 15 are preferably positioned at opposite lateral sides of the accessory-receiving depression 16 posteriorly adjacent to the device edge-opposing periphery portion 13.

The cradle formations 10 and 50 may preferably be used in combination with a number of accessory assemblies as variously exemplified for enhancing functionality of the cradle formations 10 and 50. A number of the exemplary accessory assemblies according to the present invention incorporate the use of a band or band assembly as exemplified by a first accessory assembly or armband assembly as at 21; a second accessory assembly or folio cover assembly as at 22; a third accessory assembly or belt clip assembly as at 23; a sixth accessory assembly or slotted card-holding assembly as at 26; and a seventh accessory assembly or (magnetic) kickstand assembly as at 27.

Each of the accessory assemblies 21, 22, 23, 26, and 27 according to the present invention preferably comprises a band portion as at 28. The band portions 28 each preferably comprise a band width as at 29 and a band thickness as at 30. The band portion(s) 28 are receivable in the accessory-receiving depression 16 via the opposed fastener-letting apertures 15 such that the band width 29 extends intermediate the opposed depression-flanking portions 19 and the band thickness 30 extends intermediate the depression and flanking planes 100 and 101. The band portion(s) 28 basically function to attach a select structure (as selected from the components of accessory assemblies 21, 22, 23, 26, and 27) to the cradle formations 10 and/or 50. The various cradle assemblies comprising the basic cradle formations 10 or 50 and accessory assemblies 21, 22, 23, 26, and 27 thereby attach the select structure to the mobile communications device 11.

Figure 10:
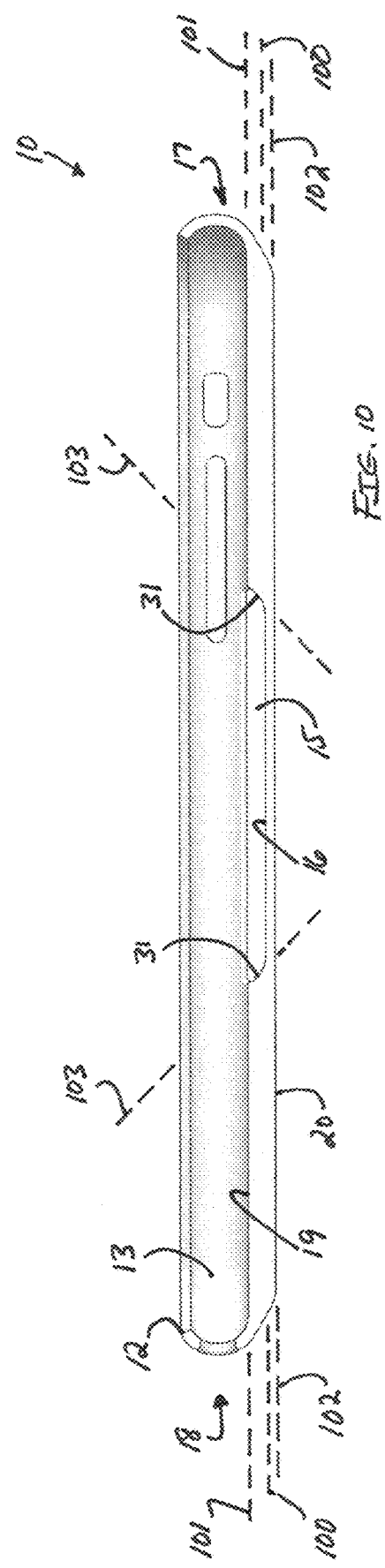
FIG. 10 is an enlarged, longitudinal cross-sectional view of the preferred cradle formation for a mobile communications device according to the present invention.
Figure 13:
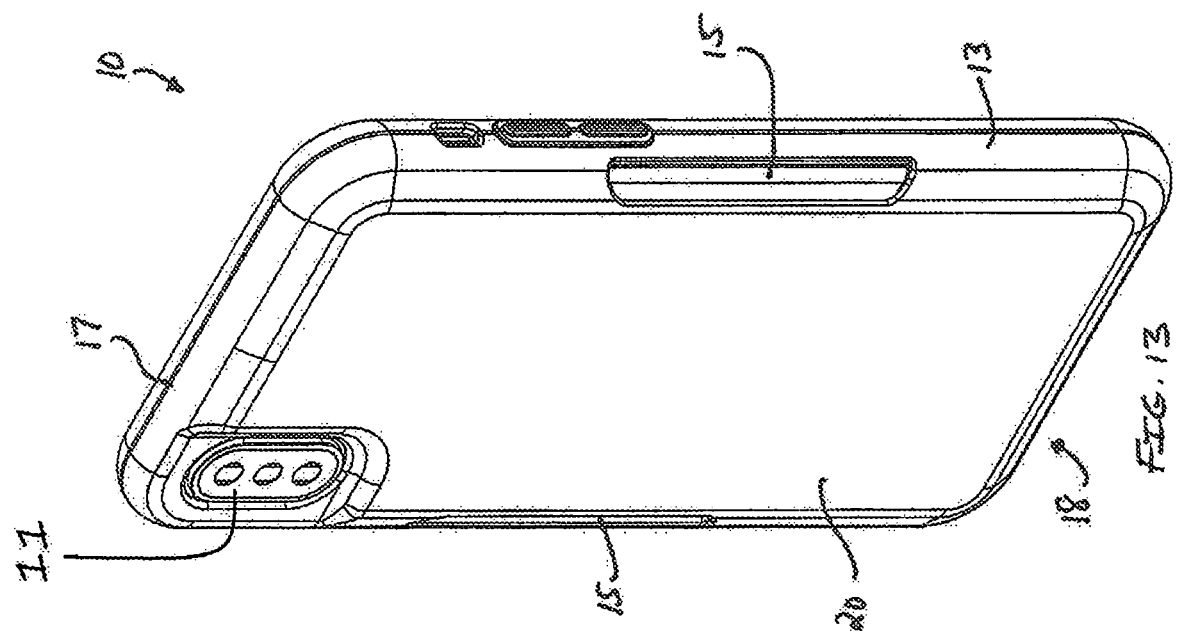
FIG. 13 is a second posterior perspective view of the preferred cradle formation for a mobile communications device according to the present invention cradling a Prior Art mobile communications device.
Figure 12:
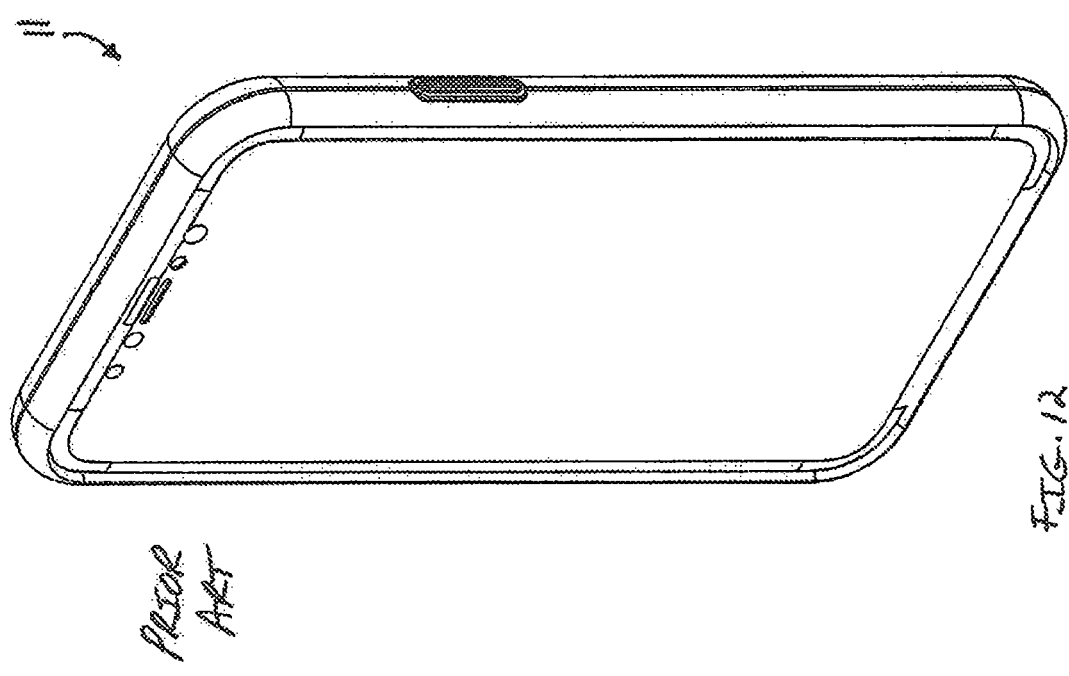
FIG. 12 is an anterior perspective view of a Prior Art mobile communications device usable in combination with the preferred cradle formation according to the present invention.
Figure 31:
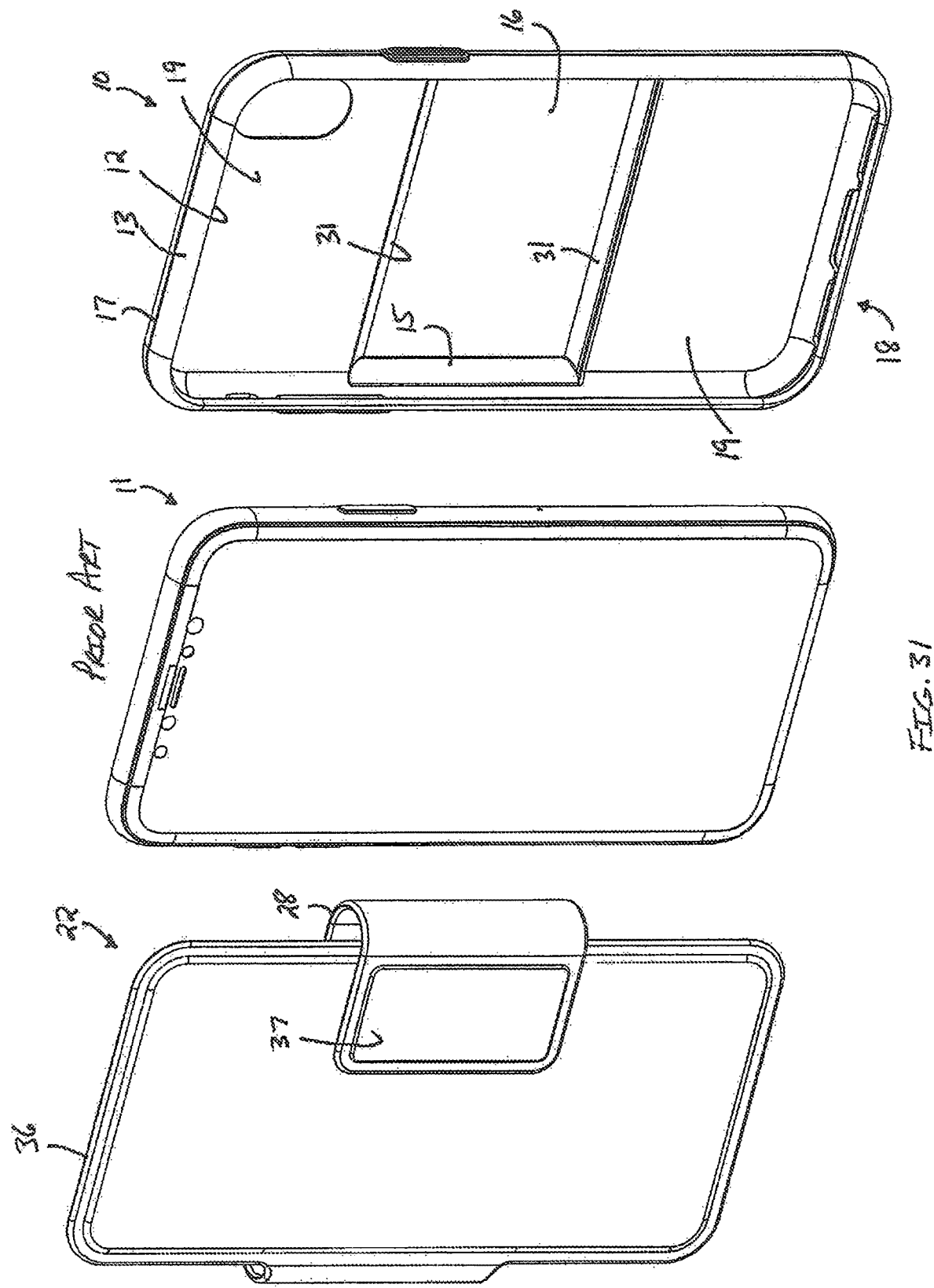
FIG. 31 is an exploded anterior perspective view of from left-to-right a second accessory assembly or folio cover assembly, a Prior Art mobile communications device, and the preferred cradle formation according to the present invention.
Figure 33:
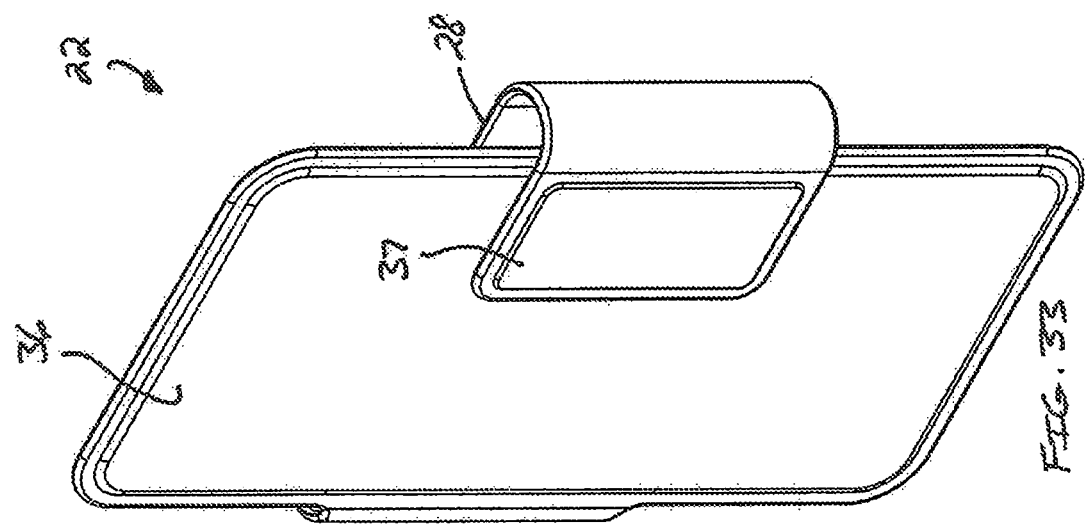
FIG. 33 is an anterior perspective view of the second accessory assembly or folio cover assembly according to the present invention.
Figure 32:
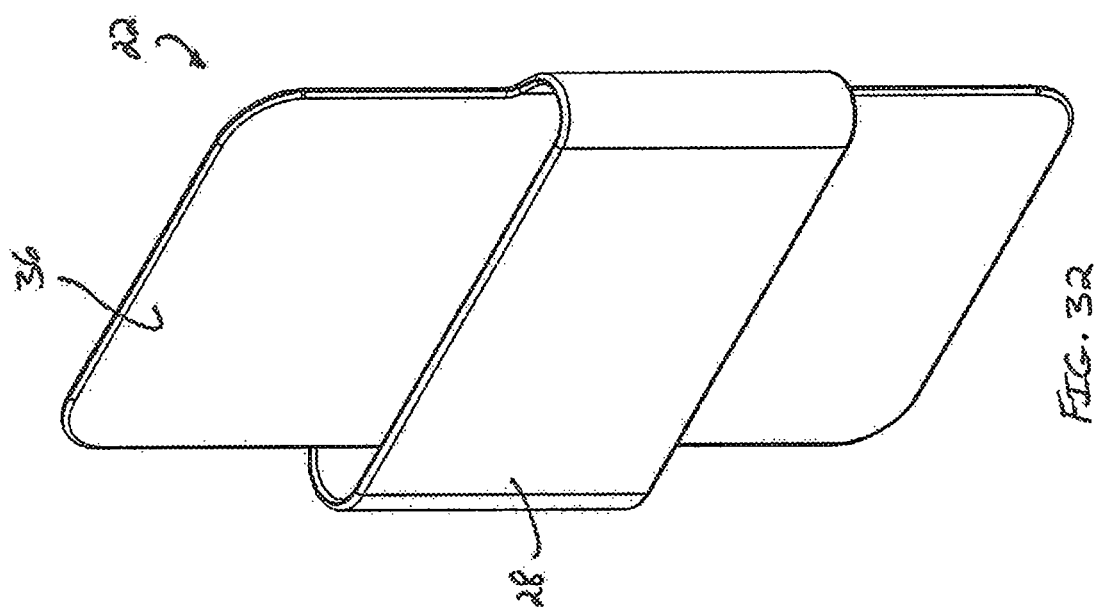
FIG. 32 is a posterior perspective view of the second accessory assembly or folio cover assembly according to the present invention.
Figure 35:
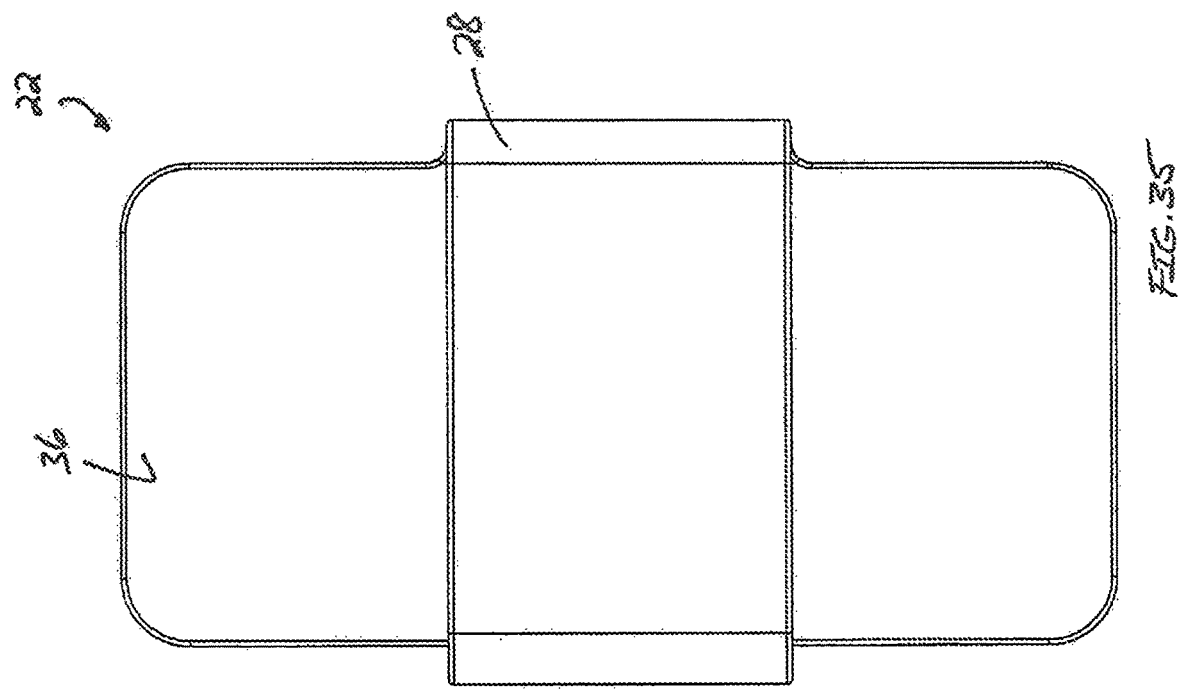
FIG. 35 is a posterior plan view of the second accessory assembly or folio cover assembly according to the present invention.
Figure 34:
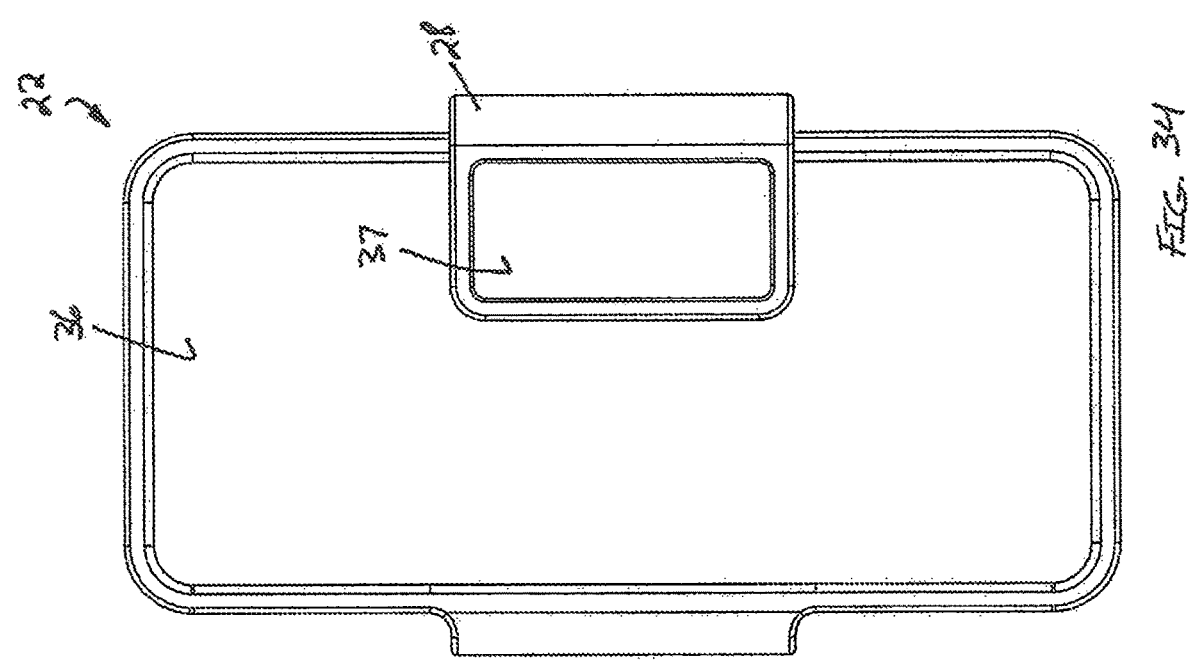
FIG. 34 is an anterior plan view of the second accessory assembly or folio cover assembly according to the present invention.
Figure 43:
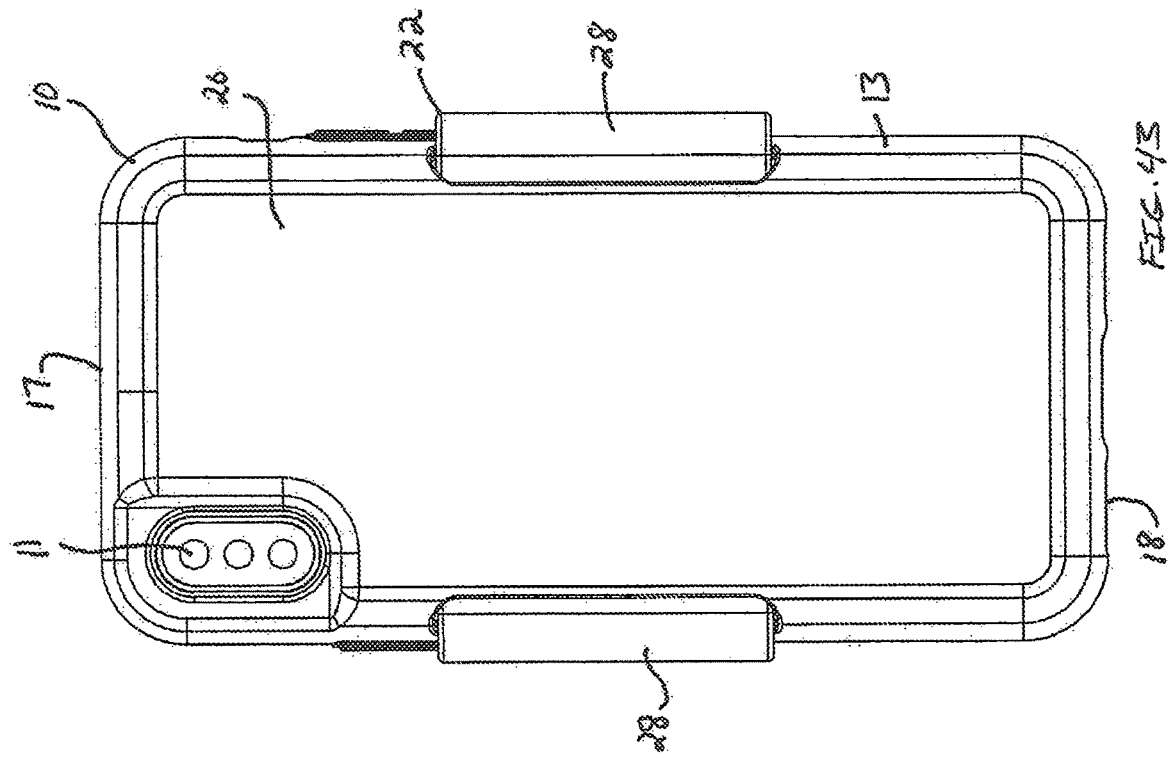
FIG. 43 is a first posterior plan view of the second cradle assembly according to the present invention showing in combination the preferred cradle formation cradling a Prior Art mobile communications device and the second accessory assembly or folio cover assembly.
Figure 42:
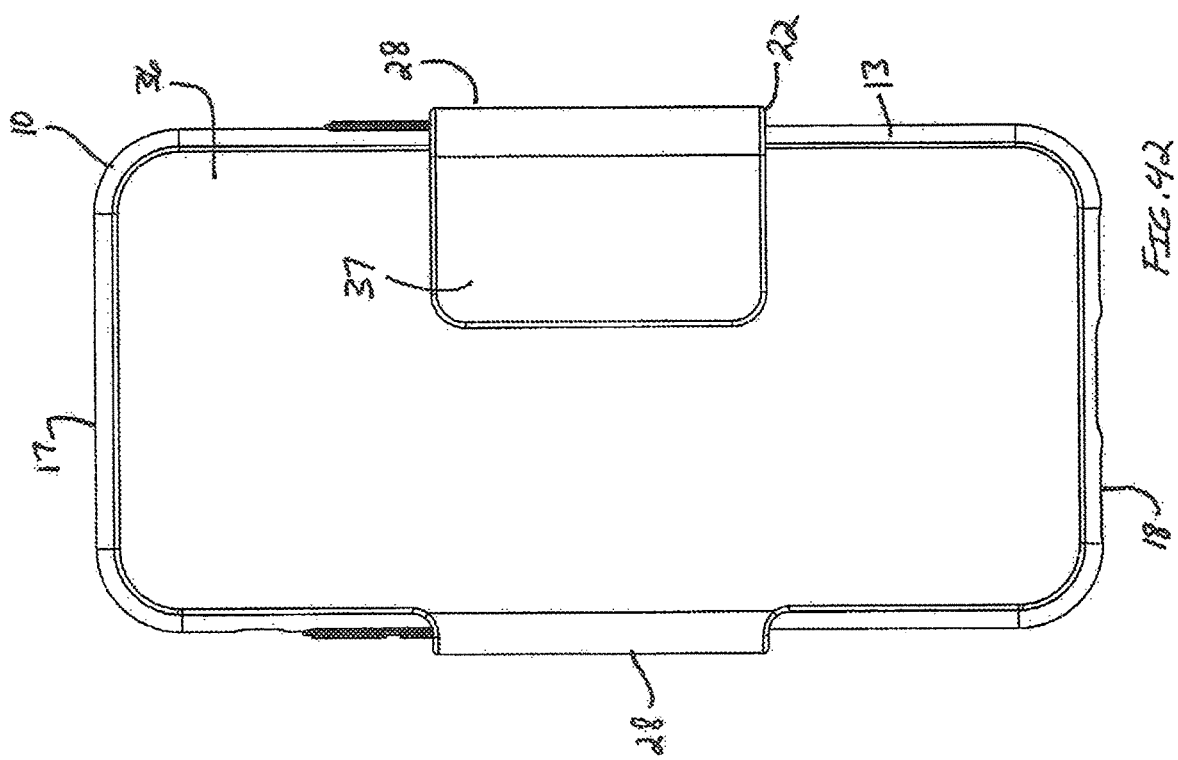
FIG. 42 is a first anterior plan view of a second cradle assembly according to the present invention showing in combination the preferred cradle formation and the second accessory assembly or folio cover assembly.
Figure 44B:
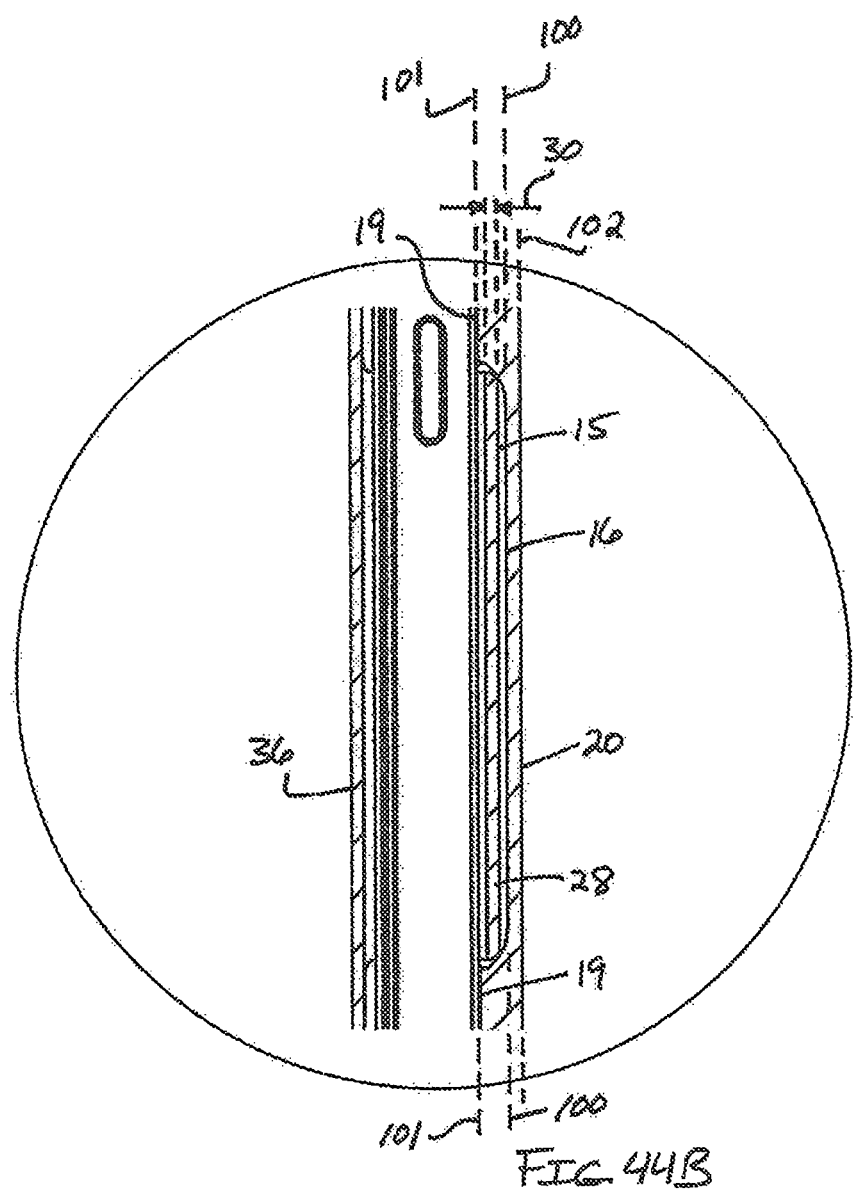
FIG. 44B is an enlarged, fragmentary, cross-sectional view of the second cradle assembly according to the present invention as enlarged, fragmented, and sectioned from FIG. 44A to show in greater clarity structure details of the second cradle assembly.
Figure 52:
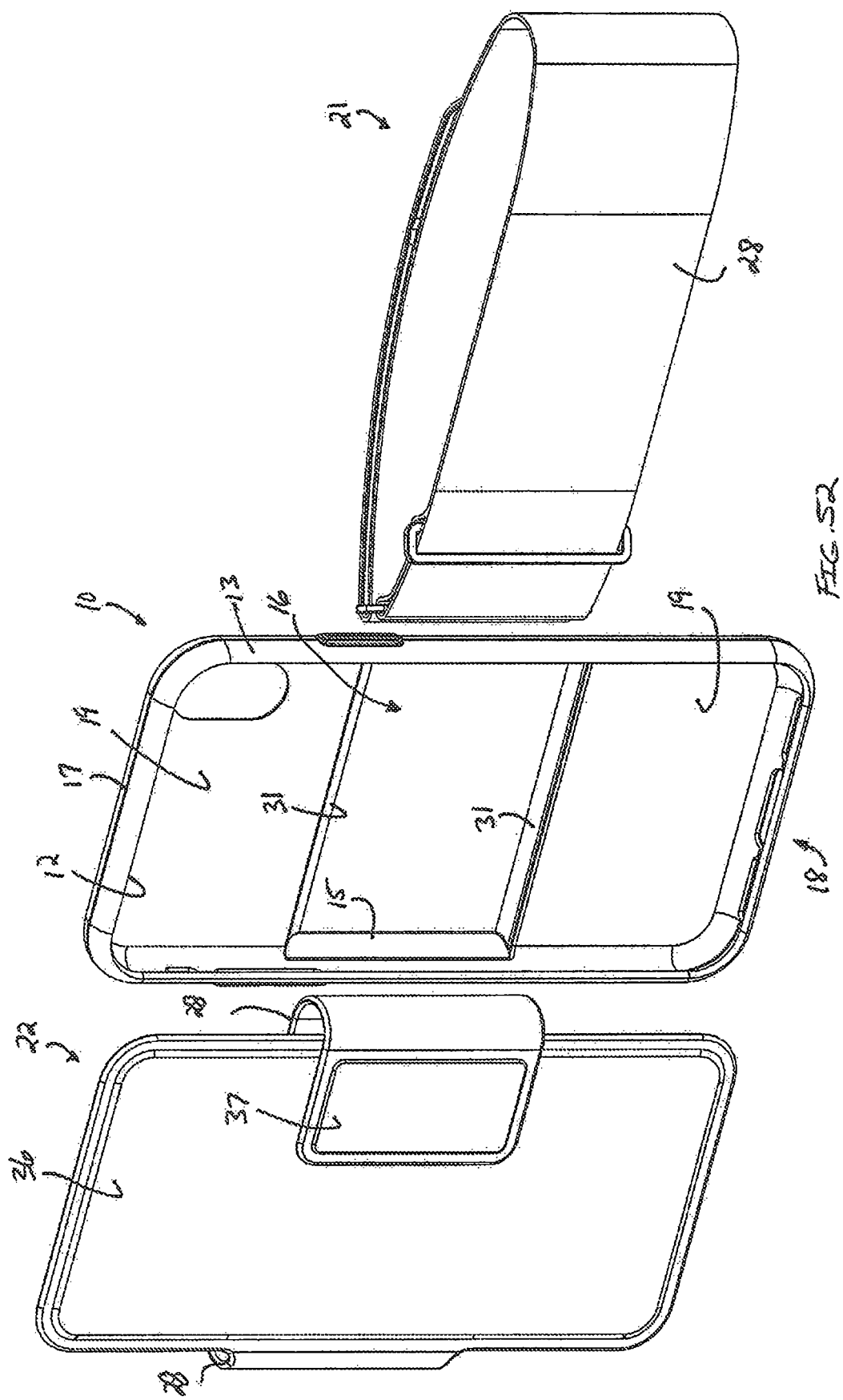
FIG. 52 is an anterior exploded view the first cradle assembly for a mobile communications device according to the present invention showing from left-to-right the second accessory assembly or folio cover assembly, the preferred cradle formation, and the first accessory assembly or armband assembly.
Figure 62:
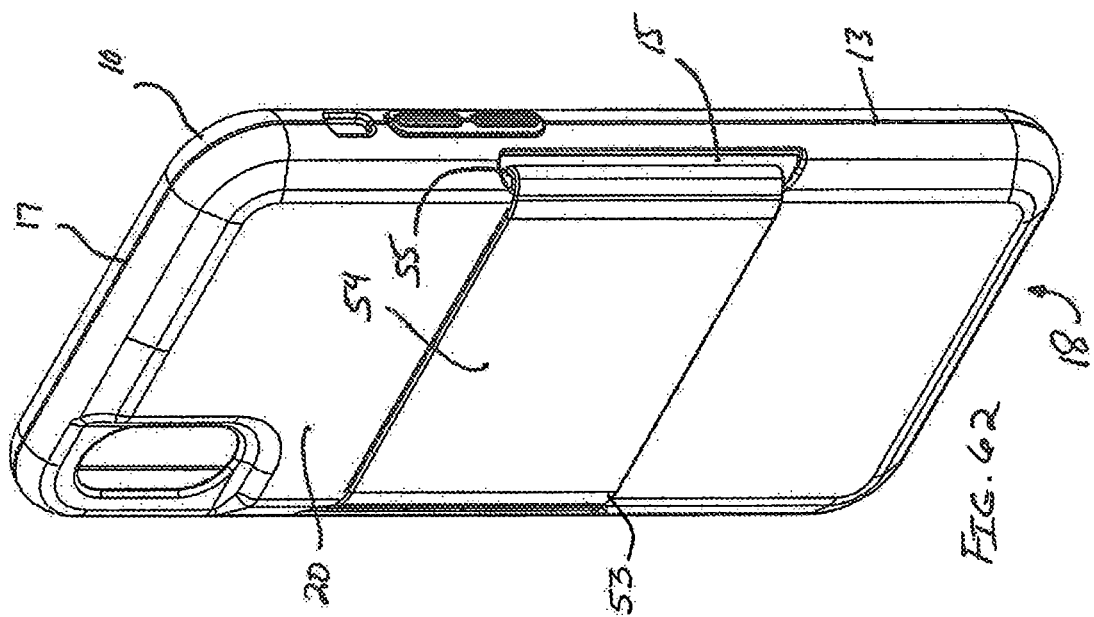
FIG. 62 is a posterior perspective view of the preferred cradle formation outfitted with the generic attachment interface structure according to the present invention.
Figure 61:
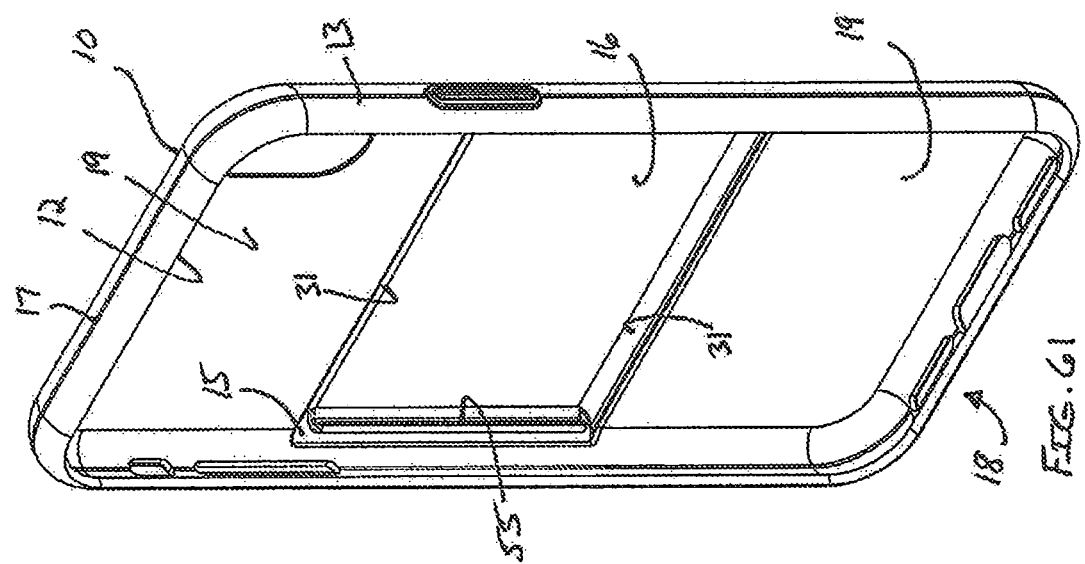
FIG. 61 is an anterior perspective view of the preferred cradle formation outfitted with a generic attachment interface structure according to the present invention.
Figure 74:
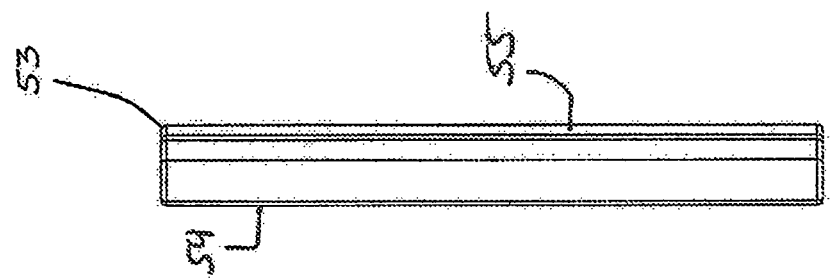
FIG. 74 is a second end view of the generic attachment interface structure according to the present invention.
Figure 73:
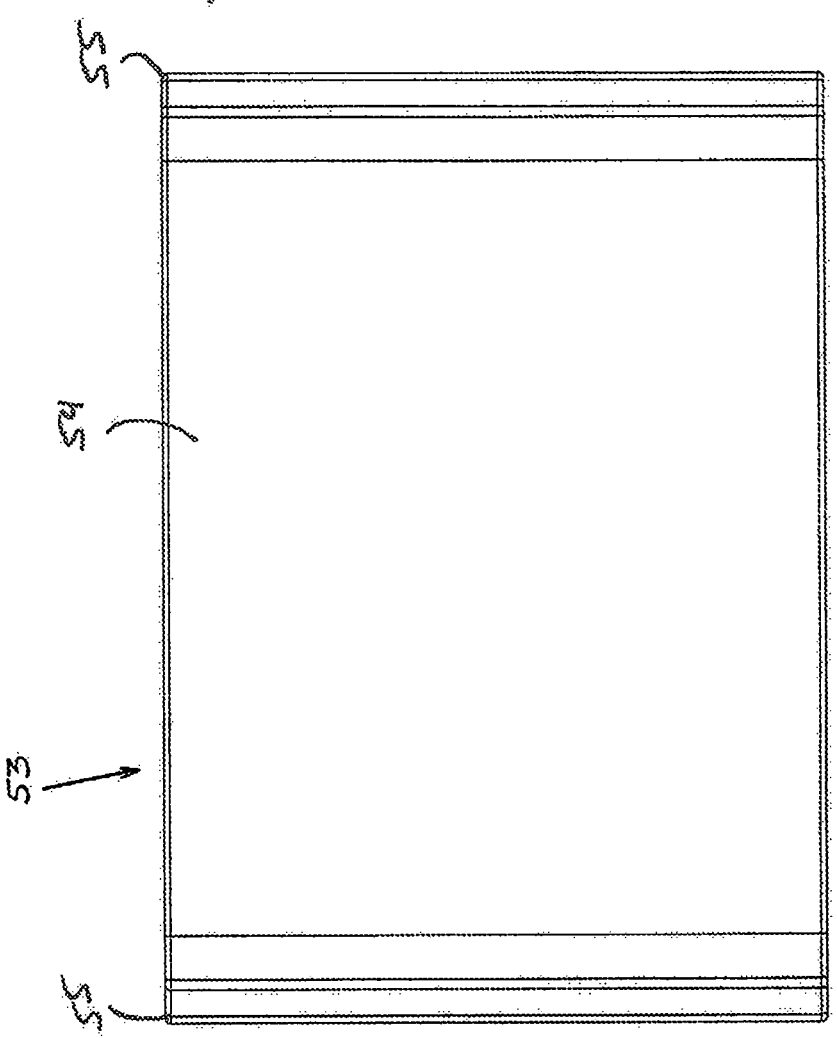
FIG. 73 is a posterior plan view of the generic attachment interface structure according to the present invention.
Figure 72:
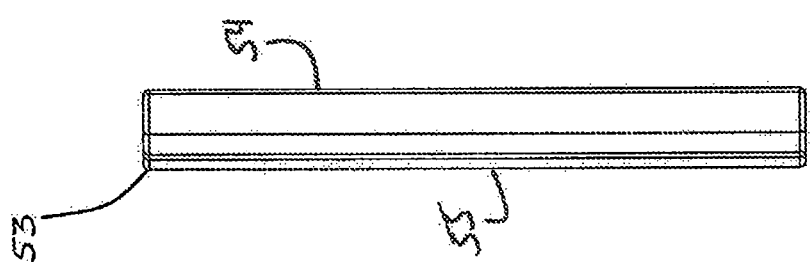
FIG. 72 is a first end view of the generic attachment interface structure according to the present invention.
Figure 75:
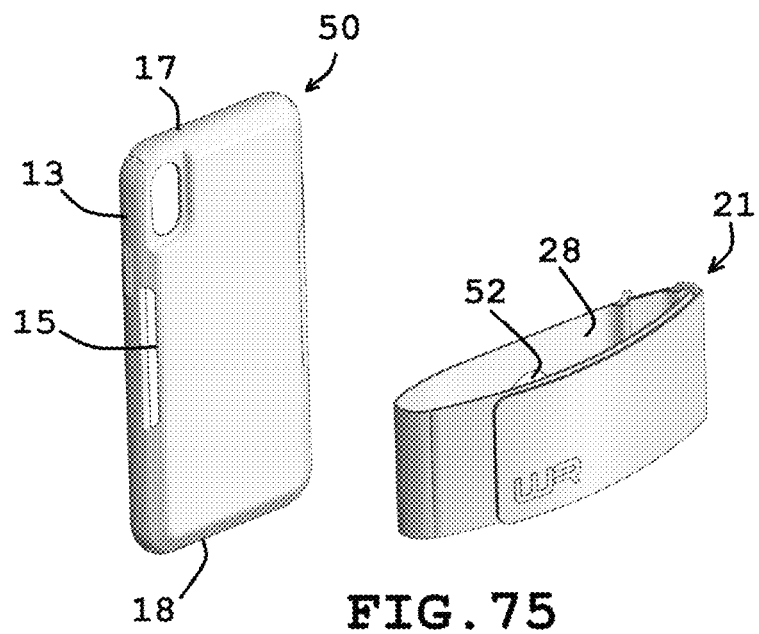
FIG. 75 is an exploded posterior perspective view of a third cradle assembly according to the present invention showing the alternative cradle formation and the first accessory assembly or armband assembly.

The accessory-receiving depression 16 may preferably further comprise opposed sloped portions 31 adjacent the opposed depression-flanking portions 19, which sloped portions 31 extend obliquely relative to the depression and flanking planes 100 and 101 within sloped portion planes 103. In this regard, the reader will further note that the fastener-letting apertures 15 may preferably approximate an isosceles trapezoid in general form as depicted and referenced in FIG. 10A. The isosceles trapezoidal fastener-letting apertures 15 preferably comprise a long side segment as at 32 at the device edge-opposing periphery portion 13 coplanar with the flanking plane 101, and a short side segment 33 at the accessory-receiving depression 16 coplanar with the depression plane 100. The opposed leg segments at the sloped portions 31 are preferably coplanar with the sloped portion planes 103.

Cradle formation 50 differs from cradle formation 10 in that the former cradle formation 50 further preferably comprises an accessory-locating post as at 51 extending anteriorly from the accessory-receiving depression 16. The accessory-locating post 51, as illustrated, is preferably cylindrical and mates with an optional circular accessory-locating aperture 52 formed in band portion(s) 28. When mated, the accessory-locating post 51 and accessory-locating aperture 52 prevent (lateral) displacements of the band portions 28 for enhancing securement of the cradle formation 50 relative to the band portion(s) 28.

Comparatively referencing FIGS. 61-74, the reader will there consider a generic attachment interface structure 53 according to the present invention. The attachment interface structure 53 preferably comprises a cradle-traversing bridge portion as at 54 and hooked end portions as at 55. The hooked end portions 55 are received in the fastener-letting apertures 15 for attaching the cradle-traversing bridge portion 54 in posterior adjacency to the posterior surface 20. Various alternative attachment structures or fastening mechanisms may be attached to or mounted upon the bridge portion 54 for enabling the user to attach the cradle formation(s) 10 and/or 50 to support structures.

In this regard, the reader will consider a (bicycle) clamp type fastening mechanism as at 56 for mounting the cradle formations 10/50 and mobile communications device(s) 11 to a bicycle, for example; or a vehicular vent mount type fastening mechanism as at 57 for mounting the cradle formations 10/50 to a vehicular air vent, for example. Both the clamp type fastening mechanism 56 and the vent mount type fastening mechanism 57 may be preferably attached to or mounted upon the bridge portion 54, which bridge portion 54 may be attached to the cradle formations 10 and/or 50 via the hooked end portions 55 as hooked through the fastener-letting apertures 15.

The bicycle clamp accessory assembly 60 according to the present invention is generally depicted and referenced in FIGS. 79 and 80 and the vehicular vent mount accessory assembly 61 according to the present invention is generally depicted and referenced in FIGS. 81 and 82. The first accessory assembly or armband assembly 21 preferably comprises a band portion 28 as previously described and hook and loop fastening structure as at 34 and an adjustment mechanism 35 for adjusting the length of the effective arm-encircling loop of the armband assembly 21. The second accessory assembly or folio cover assembly 22 preferably comprises a band portion 28 that interconnects a (magnetic) folio cover portion as at 36 for covering the visual display portion of a mobile communications device 11 and a (magnetic) cover-engaging tab portion as at 37 for (magnetically) holding the folio cover portion 36 in device-covering position.

The third accessory assembly or belt clip assembly 23 is generally depicted and referenced in FIGS. 77 and 78 and preferably comprises a band portion 28 and a clip mechanism as at 38. The clip mechanism 38 may be alternatively mounted to a bridge portion 54. The sixth accessory assembly or slotted card-holding assembly 26 is generally depicted and referenced in FIGS. 83 and 84 and preferably comprises a band portion 28 and a slotted card-holding portion as at 39 comprising a series of card-receiving pockets denoted by upper slot edges as at 40. The seventh accessory assembly or (magnetic) kickstand assembly 27 is generally depicted and referenced in FIG. 87 and preferably comprises a band portion 28 outfitted with magnets and substantially rigid end elements 41 for enabling the user to prop the cradle formations 10/50 in an angled display position as at 42 in FIG. 87.

While the above descriptions contain much specificity, this specificity should not be construed as limitations on the scope of the invention, but rather as an exemplification of the invention. In certain embodiments, the basic invention may be said to essentially teach or disclose a cradle formation usable with a number of accessory components for forming a cradle assembly and for general use with a mobile communications device so as to enhance the functionality thereof. The cradle formation(s) according to the present invention may be said to preferably comprise an anterior device-receiving mouth, a device edge-opposing periphery portion, an anterior device back-opposing portion, and opposed fastener-letting apertures.

Central to the practice of the present invention is the anterior device back-opposing portion as at 14 comprising an upper planar surface extending within the flanking plane 101 and a lower planar surface extending within the depression plane 100. The anterior device back-opposing portion is characterized by comprising an accessory-receiving depression and opposed depression-flanking portions, the accessory-receiving depression extends in the depression plane, and the opposed depression-flanking portions extend in the flanking plane, which depression and flanking planes are parallel.

The opposed fastener-letting apertures are preferably positioned at opposite lateral sides of the accessory-receiving depression adjacent the device edge-opposing periphery portion and are designed to mate or structurally cooperate with a select fastener assembly as exemplified by either a band portion as at 28 or an interface structure as at 53. Both the band portion 28 and the interface structure 53 may preferably comprise assorted other select fastening mechanisms or means (e.g. a belt clip, bike clamp, a vent mount, a slotted card holder, a folio cover, a kickstand mechanism, an armband, and/or combinations thereof) for enhancing the functionality of the resulting cradle assembly. The band assembly may preferably comprise a magnetic attachment mechanism (e.g. within the folio cover assembly or the kickstand assembly) for enabling a user to magnetically a select band portion to a secondary magnetic structure (i.e. to other non-accessory-assembly magnetic structures or to other magnetic portions of the select accessory assembly).

The select fastener assembly is attachable to the cradle formation via the fastener-letting apertures 15 by either feeding the band portion 28 of a band assembly through the apertures 15 or clipping the hooked end portions 55 of the interface structure 53 into the apertures 15. With regard to the band portion 28, it will be recalled that band portion 28 preferably comprises a band width and a band thickness. The band portion is receivable in the accessory-receiving depression via the opposed fastener-letting apertures such that the band width extends intermediate the opposed depression-flanking portions and the band thickness extends intermediate the depression and flanking planes.

The band portion attaches a select structure to the cradle formation, and the cradle formation is dimensioned for receiving and protecting the mobile communications device. The resulting cradle assembly thereby attaches the select structure to the mobile communications device. The accessory-receiving depression may preferably comprise an accessory-locating post and the band portion may preferably comprise an accessory-locating aperture. The accessory-locating post and the accessory-locating aperture are matable for preventing displacements of the band portion relative to the accessory-receiving depression. One band assembly according to the present invention may preferably comprise or provide a folio cover for selectively covering the mobile communications device as received within the cradle formation.

The accessory-receiving depression may further preferably comprise opposed sloped portions adjacent the opposed depression-flanking portions. The sloped portions preferably extend obliquely relative to the depression and flanking planes in sloped portion planes. The fastener-letting apertures are each isosceles trapezoidal in form being defined in part by the parallel depression and flanking planes and the sloped portion planes. The fastener-letting apertures, being isosceles trapezoidal in form, preferably comprise a long side segment at the device edge-opposing periphery portion coplanar with the flanking plane, a short side segment at the accessory-receiving depression coplanar with the depression plane, and opposed leg segments at the sloped portions coplanar with the sloped portion planes.

The present invention may thus be said to very essentially provide a cradle formation for use with a mobile communications device comprising an anterior device back-opposing portion and opposed fastener-letting apertures. The anterior device back-opposing portion may be characterized by comprising an accessory-receiving depression and opposed depression-flanking portions. The accessory-receiving depression extends in a depression plane, and the opposed depression-flanking portions extend in a flanking plane parallel to the depression plane.

The opposed fastener-letting apertures are positioned at opposite lateral sides of the accessory-receiving depression. The cradle formation is dimensioned for receiving and protecting select portions of the mobile communications device, and is usable in combination with a select fastener assembly attachable to the cradle formation via the fastener-letting apertures. The select fastener assembly may preferably be a band assembly comprising a band portion for attaching a select structure to the cradle formation.

The band portion comprises a band width and a band thickness. The band portion is receivable in the accessory-receiving depression via the opposed fastener-letting apertures such that the band width extends intermediate the opposed depression-flanking portions and the band thickness extends intermediate the depression and flanking planes, the band portion for attaching a select structure to the cradle formation. The accessory-receiving depression may preferably further comprise an accessory-locating post and the band portion may preferably further comprise an accessory-locating aperture. The accessory-locating post and the accessory-locating aperture are matable for preventing displacements of the band portion relative to the accessory-receiving depression.

Although the cradle formation and cradle assemblies resulting from combinations of any of the select accessory assemblies according to the present invention have been described by reference to a number of different embodiments, aspects, and features, it is not intended that the novel combinations or assemblies be limited thereby, but that modifications thereof are intended to be included as falling within the broad scope and spirit of the foregoing disclosure, the appended drawings, and the following claims.

What is claimed is:

1. A cradle assembly for use with a mobile communications device, the cradle assembly comprising:
   a cradle formation, the cradle formation comprising an anterior device-receiving mouth, a device edge-opposing periphery portion, an anterior device back-opposing portion, and opposed fastener-letting apertures, the anterior device back-opposing portion being characterized by comprising an accessory-receiving depression and opposed depression-flanking portions, the accessory-receiving depression extending in a depression plane, the opposed depression-flanking portions extending in a flanking plane, the depression and flanking planes being parallel, the opposed fastener-letting apertures being positioned at opposite lateral sides of the accessory-receiving depression adjacent the device edge-opposing periphery portion; and
   a band assembly, the band assembly comprising a band portion, the band portion comprising a band width and a band thickness, the band portion being receivable in the accessory-receiving depression via the opposed fastener-letting apertures such that the band width extends intermediate the opposed depression-flanking portions and the band thickness extends intermediate the depression and flanking planes, the band portion for attaching a select structure to the cradle formation, the cradle formation being dimensioned for receiving and protecting the mobile communications device, the cradle assembly thus for attaching the select structure to the mobile communications device.

2. The cradle assembly of claim 1 wherein the accessory-receiving depression comprises an accessory-locating post and the band portion comprises an accessory-locating aperture, the accessory-locating post and the accessory-locating aperture being matable for preventing displacements of the band portion relative to the accessory-receiving depression.

3. The cradle assembly of claim 1 wherein the band assembly comprises a folio cover, the folio cover for selectively covering the mobile communications device as received within the cradle formation.

4. The cradle assembly of claim 1 wherein the band assembly comprises a select fastening mechanism, the select fastening mechanism for enabling a user to attach the cradle assembly to a select support structure.

5. The cradle assembly of claim 1 wherein the accessory-receiving depression comprises opposed sloped portions adjacent the opposed depression-flanking portions, the sloped portions extending obliquely relative to the depression and flanking planes in sloped portion planes.

6. The cradle assembly of claim 5 wherein the fastener-letting apertures are each isosceles trapezoidal in form, the fastener-letting apertures being isosceles trapezoidal in form comprising a long side segment at the device edge-opposing periphery portion coplanar with the flanking plane, a short side segment at the accessory-receiving depression coplanar with the depression plane, and opposed leg segments at the sloped portions coplanar with the sloped portion planes.

7. The cradle assembly of claim 1 wherein the band assembly comprises a magnetic attachment mechanism for enabling a user to magnetically a select band portion to a secondary magnetic structure.

8. A cradle formation for use with a mobile communications device, the cradle formation comprising an anterior device-receiving mouth, a device edge-opposing periphery portion, an anterior device back-opposing portion, and opposed fastener-letting apertures, the anterior device back-opposing portion being characterized by comprising an accessory-receiving depression and opposed depression-flanking portions, the accessory-receiving depression extending in a depression plane and comprising opposed sloped portions adjacent the opposed depression-flanking portions, the sloped portions extending obliquely relative to the depression and flanking planes in sloped portion planes, the opposed depression-flanking portions extending in a flanking plane, the depression and flanking planes being parallel, the opposed fastener-letting apertures being positioned at opposite lateral sides of the accessory-receiving depression adjacent the device edge-opposing periphery portion, the cradle formation being dimensioned for receiving and protecting the mobile communications device.

9. The cradle formation of claim 8 usable in combination with a select fastener assembly, the select fastener assembly being attachable to the cradle formation via the fastener-letting apertures.

10. The cradle formation of claim 9 wherein the select fastener assembly is a band assembly, the band assembly comprising a band portion, the band portion comprising a band width and a band thickness, the band portion being receivable in the accessory-receiving depression via the opposed fastener-letting apertures such that the band width extends intermediate the opposed depression-flanking portions and the band thickness extends intermediate the depression and flanking planes, the band portion for attaching a select structure to the cradle formation.

11. The cradle formation of claim 10 wherein the accessory-receiving depression comprises an accessory-locating post and the band portion comprises an accessory-locating aperture, the accessory-locating post and the accessory-locating aperture being matable for preventing displacements of the band portion relative to the accessory-receiving depression.

12. The cradle formation of claim 10 wherein the band assembly comprises a folio cover, the folio cover for selectively covering the mobile communications device as received within the cradle formation.

13. The cradle formation of claim 10 wherein the band assembly comprises a select fastening mechanism, the select fastening mechanism for enabling a user to attach the cradle assembly to a select support structure.

14. The cradle assembly of claim 10 wherein the band assembly comprises a magnetic attachment mechanism for enabling a user to magnetically a select band portion to a secondary magnetic structure.

15. The cradle formation of claim 8 wherein the fastener-letting apertures are each isosceles trapezoidal in form, the fastener-letting apertures being isosceles trapezoidal in form comprising a long side segment at the device edge-opposing periphery portion coplanar with the flanking plane, a short side segment at the accessory-receiving depression coplanar with the depression plane, and opposed leg segments at the sloped portions coplanar with the sloped portion planes.

16. A cradle formation for use with a mobile communications device, the cradle formation comprising an anterior device back-opposing portion, and opposed fastener-letting apertures, the anterior device back-opposing portion being characterized by comprising an accessory-receiving depression and opposed depression-flanking portions, the accessory-receiving depression extending in a depression plane and comprising opposed sloped portions adjacent the opposed depression-flanking portions, the sloped portions extending obliquely relative to the depression and flanking planes in sloped portion planes, the opposed depression-flanking portions extending in a flanking plane, the depression and flanking planes being parallel, the opposed fastener-letting apertures being positioned at opposite lateral sides of the accessory-receiving depression, the cradle formation being dimensioned for receiving and protecting select portions of the mobile communications device.

17. The cradle formation of claim 16 usable in combination with a select fastener assembly, the select fastener assembly being attachable to the cradle formation via the fastener-letting apertures.

18. The cradle formation of claim 17 wherein the select fastener assembly is a band assembly, the band assembly comprising a band portion, the band portion comprising a band width and a band thickness, the band portion being receivable in the accessory-receiving depression via the opposed fastener-letting apertures such that the band width extends intermediate the opposed depression-flanking portions and the band thickness extends intermediate the depression and flanking planes, the band portion for attaching a select structure to the cradle formation.

19. The cradle formation of claim 18 wherein the accessory-receiving depression comprises an accessory-locating post and the band portion comprises an accessory-locating aperture, the accessory-locating post and the accessory-locating aperture being matable for preventing displacements of the band portion relative to the accessory-receiving depression.

* * * * *